US012149967B2

(12) United States Patent
Cui et al.

(10) Patent No.: US 12,149,967 B2
(45) Date of Patent: Nov. 19, 2024

(54) MEASUREMENT GAP CONFIGURATION FOR A FREQUENCY RANGE EQUAL TO OR LARGER THAN 52.6 GHz

(71) Applicant: Apple Inc., Cupertino, CA (US)

(72) Inventors: Jie Cui, San Jose, CA (US); Qiming Li, Beijing (CN); Dawei Zhang, Saratoga, CA (US); Hong He, San Jose, CA (US); Huaning Niu, San Jose, CA (US); Manasa Raghavan, Sunnyvale, CA (US); Xiang Chen, Campbell, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 455 days.

(21) Appl. No.: 17/441,696

(22) PCT Filed: May 4, 2021

(86) PCT No.: PCT/CN2021/091809
§ 371 (c)(1),
(2) Date: Sep. 21, 2021

(87) PCT Pub. No.: WO2022/232964
PCT Pub. Date: Nov. 10, 2022

(65) Prior Publication Data
US 2023/0232256 A1  Jul. 20, 2023

(51) Int. Cl.
*H04W 24/08* (2009.01)
*H04L 5/00* (2006.01)
*H04W 24/10* (2009.01)

(52) U.S. Cl.
CPC .......... *H04W 24/08* (2013.01); *H04L 5/0048* (2013.01); *H04W 24/10* (2013.01)

(58) Field of Classification Search
None
See application file for complete search history.

(56) References Cited

U.S. PATENT DOCUMENTS

2016/0157116 A1   6/2016  Zhang et al.
2019/0020440 A1*  1/2019  Santhanam .......... H04L 1/1614
(Continued)

FOREIGN PATENT DOCUMENTS

CN      102291759      12/2011
CN      107645732      1/2018
(Continued)

OTHER PUBLICATIONS

Author Unknown, Discussion on multiple concurrent MGs, Doc. No R4-2107028 ("028"), pp. 1-3, Apr. 20, 2021.*
(Continued)

*Primary Examiner* — Christopher M Crutchfield
(74) *Attorney, Agent, or Firm* — Kilpatrick Townsend & Stockton LLP

(57) ABSTRACT

The present application relates to devices and components including apparatus, systems, and methods to perform measurements on reference signals based on measurement gaps. In an example, a device supports a frequency range that includes frequencies equal to or larger than 52.6 GHz. Measurement gap capability information is used to indicate and/or determine whether a measurement gap is supported for this frequency range. If so, measurement gap configuration can be defined and can include a measurement gap length and/or a measurement gap repetition period defined based on the frequencies being equal to or larger than 52.6 GHz.

19 Claims, 10 Drawing Sheets

(56) References Cited

U.S. PATENT DOCUMENTS

| | | | |
|---|---|---|---|
| 2019/0075585 A1* | 3/2019 | Deogun | H04W 72/23 |
| 2021/0227409 A1* | 7/2021 | Siomina | H04B 7/0617 |
| 2022/0022147 A1* | 1/2022 | Lei | H04W 72/0453 |
| 2022/0038927 A1* | 2/2022 | Manolakos | H04L 5/0053 |
| 2023/0134401 A1* | 5/2023 | Hu | H04W 36/0088 370/252 |
| 2023/0328571 A1* | 10/2023 | Wang | H04L 5/001 370/241 |
| 2023/0345408 A1* | 10/2023 | Thomas | H04W 64/00 |
| 2023/0354297 A1* | 11/2023 | Yamamoto | H04W 68/00 |

FOREIGN PATENT DOCUMENTS

| | | | |
|---|---|---|---|
| CN | 111247852 | | 6/2020 |
| CN | 111466129 | | 7/2020 |
| CN | 112567655 | | 3/2021 |
| CN | 112640555 | | 4/2021 |
| WO | 2020/101484 | * | 7/2020 |
| WO | 2021/078531 | * | 1/2021 |

OTHER PUBLICATIONS

Author Unknown, Discussion on multiple concurrent and independent MG patterns, Doc. No. R4-2106303, pp. 1-4, Apr. 12, 2021.*

Author Unknown, Measurement gap capability information for Rel-16 UE, Doc. No. R2-1914580, pp. 1-7, Nov. 18, 2019.*

Author Unknown, Discussion on multiple concurrent and independent MG patterns, Doc. No. R2-2100222, pp. 1-5, Feb. 5, 2021.*

Author Unknown, Multiple concurrent and independent gap patterns, Doc. No. R4-2104583, pp. 1-8, Apr. 20, 2021.*

International Patent Application No. PCT/CN2021/091809, International Search Report and Written Opinion, Mailed on Jan. 28, 2022, 11 pages.

3rd Generation Partnership Project; Technical Specification Group Radio Access Network; NR; Requirements for support of radio resource management (Release 17), 3GPP TS 38.133 V17.1.0, Mar. 2021, 2173 pages.

3rd Generation Partnership Project; Technical Specification Group Radio Access Network; NR; Requirements for support of radio resource management (Release 16), 3GPP TS 38.133 V16.7.0, Mar. 2021, 2194 pages.

3rd Generation Partnership Project; Technical Specification Group Radio Access Network; NR; User Equipment (UE) radio access capabilities (Release 16), 3GPP TS 38.306 V16.4.0, Mar. 2021, 151 pages.

3rd Generation Partnership Project; Technical Specification Group Radio Access Network; NR; Radio Resource Control (RRC) protocol specification (Release 16), 3GPP TS 38.331 V16.4.1, Mar. 2021, 949 pages.

International Preliminary Report on Patentability in PCT Application No. PCT/CN2021/091809, dated Nov. 16, 2023 in 7 pages.

* cited by examiner

MEASUREMENT GAP CONFIGURATION FOR A FREQUENCY RANGE EQUAL TO OR LARGER THAN 52.6 GHz

CROSS REFERENCES TO RELATED APPLICATIONS

This application is the U.S. National Phase of PCT Application No. PCT/CN2021/091809, filed May 4, 2021, the disclosure of which is incorporated by reference in its entirety.

Fifth generation mobile network (5G) is a wireless standard that aims to improve upon data transmission speed, reliability, availability, and more. This standard, while still developing, includes numerous details relating to cell reselection, where, for instance, a user equipment (UE) can communicate with a network using channels in one or more frequency ranges.

DETAILED DESCRIPTION

Figure 1:
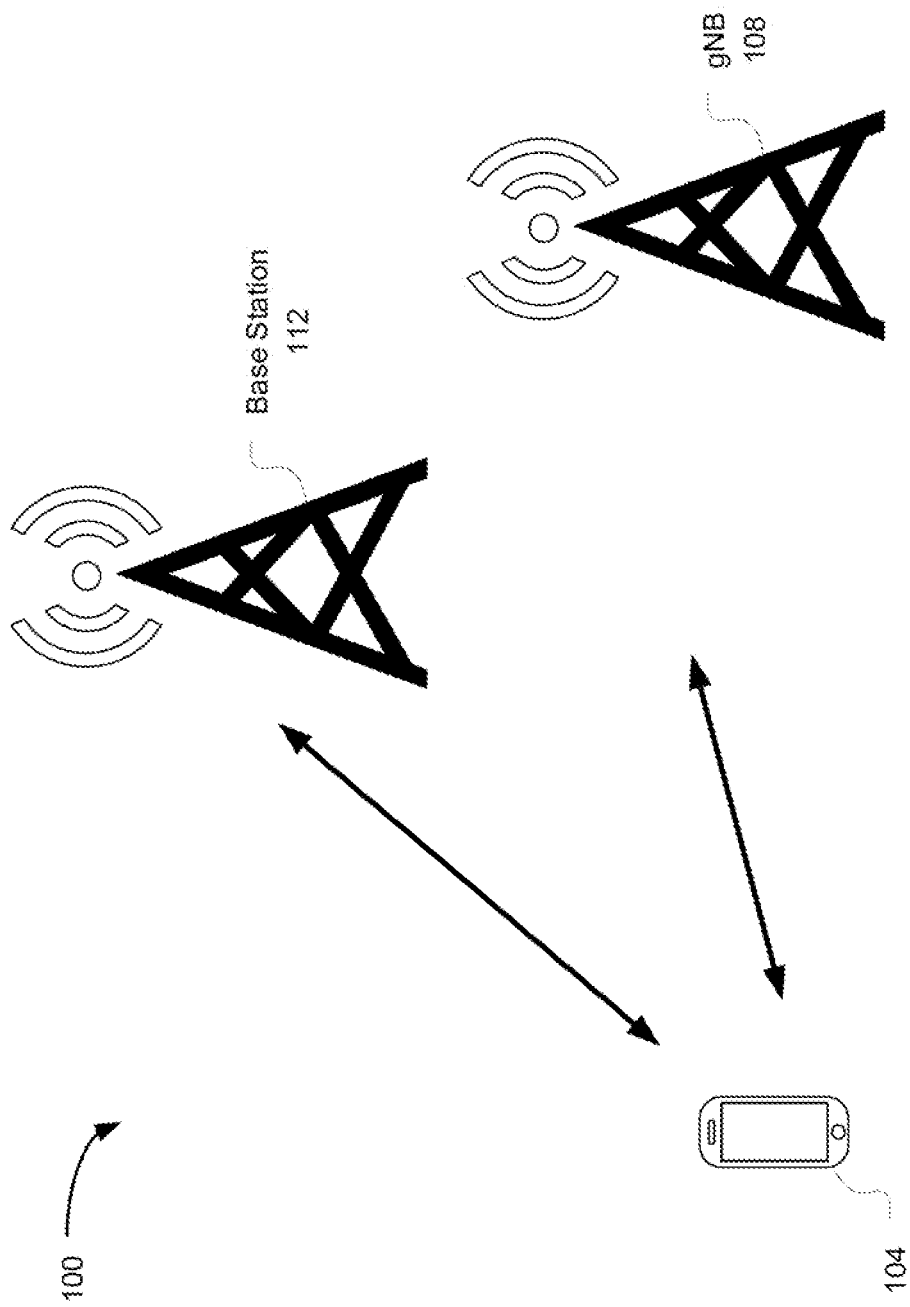
FIG. 1 illustrates an example of a network environment, in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Generally, a user equipment (UE) can communicate with a network, such as with one or more base stations or other network nodes, using channels in different frequency ranges. The available frequency ranges include frequency range 1 (FR1), between 40 megahertz (MHz) and 7.125 gigahertz (GHz), and frequency range 2 (FR2), between 24.25 GHz and 52.6 GHz. An additional frequency range may be deployed and includes frequencies larger than 52.6 GHz. This frequency range is referred to herein as a "high frequency range" (FRH). In an example, the high frequency range includes frequencies between 52.6 GHz and 71 GHz and can be referred to as frequency range 3 (FR3) or frequency range 2 extension (FR2x). Of course, the upper bound of the high frequency range can be different than 71 GHz. In comparison, its lower bound may be equal to or larger than 52.6 GHz and does not overlap with the FR2 frequency range.

The UE can use a measurement gap to perform measurements on reference signals (RSs) in a frequency range (e.g., any of FR1, FR2, or FRH). The measurement gap can have a configuration that indicates a time duration (referred to as measurement gap length (MGL) and a repetition period (referred to as measurement gap repetition period (MGRP)). Transmission and reception of data on one or more channels in the frequency range can be stopped for the time duration of the measurement gap, such that the UE can at least retune its radio frequency (RF) circuitry and receive the reference signals during the measurement gap. Thereafter, the transmission and reception can resume. The measurement gap can be repeated according to the repetition period.

In the time domain, communications using the high frequency range (FRH) can use shorter slots relative to the FR1 and FR2 frequency ranges. To optimize the data transmission/reception and RS measurements in the high frequency range (FRH), a measurement gap configuration specific to this frequency range can be used. Relative to FR1 and FR2, this measurement gap configuration indicates shorter time duration and shorter repetition period.

In an example, the UE can indicate to a network node its support of a per-frequency range (FR) measurement gap configuration, such as whether its measurement gap support for a sub-combination of FR1, FR2, and FRH, and/or its support for all three frequency ranges. The per-FR measurement gap configurations are referred to as independent measurement gap configurations. If unsupported, the UE uses a per-UE measurement gap configuration applicable to measurements on all of the frequency ranges FR1, FR2, and FRH.

In turn, and depending on the UE's capability, the network node can configure one or more per-FR measurement gap configurations and/or a per-UE measurement gap configuration and send the relevant configuration information to the UE. The RSs to be measured by the UE are also scheduled based on this configuration information.

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or digital signal processors (DSPs) that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer to an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "base station" as used herein refers to a device with radio communication capabilities, that is a network of a communications network (or, more briefly, network), and that may be configured as an access node in the communications network. A UE's access to the communications network may be managed at least in part by the base station, whereby the UE connects with the base station to access the communications network. Depending on the radio access technology (RAT), the base station can be referred to as a gNodeB (gNB), eNodeB (eNB), access point, etc.

The term "computer system" as used herein refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like, as used herein, refer to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100, in accordance with some embodiments. The network environment 100 may include a UE 104 and a gNB 108. The gNB 108 may be a base station that provides a wireless access cell, for example, a Third Generation Partnership Project (3GPP) New Radio (NR) cell, through which the UE 104 may communicate with the gNB 108. The UE 104 and the gNB 108 may communicate over an air interface compatible with 3GPP technical specifications such as those that define Fifth Generation (5G) NR system standards.

The gNB 108 may transmit information (for example, data and control signaling) in the downlink direction by mapping logical channels on the transport channels, and transport channels onto physical channels. The logical channels may transfer data between a radio link control (RLC) and MAC layers; the transport channels may transfer data between the MAC and PHY layers; and the physical channels may transfer information across the air interface. The physical channels may include a physical broadcast channel (PBCH), a physical downlink control channel (PDCCH), and a physical downlink shared channel (PDSCH).

The PBCH may be used to broadcast system information that the UE 104 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure (including cell selection and reselection) and for beam selection.

The PDSCH may be used to transfer end-user application data, signaling radio bearer (SRB) messages, system information messages (other than, for example, MIB), and paging messages.

The PDCCH may transfer DCI that is used by a scheduler of the gNB 108 to allocate both uplink and downlink resources. The DCI may also be used to provide uplink power control commands, configure a slot format, or indicate that preemption has occurred.

The gNB 108 may also transmit various reference signals to the UE 104. The reference signals may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include channel status information reference signals (CSI-RS). The CSI-RS may be a multi-purpose downlink transmission that may be used for CSI reporting, beam management, connected mode mobility, radio link failure detection, beam failure detection and recovery, and fine tuning of time and frequency synchronization.

The reference signals and information from the physical channels may be mapped to resources of a resource grid. There is one resource grid for a given antenna port, subcarrier spacing configuration, and transmission direction (for example, downlink or uplink). The basic unit of an NR downlink resource grid may be a resource element, which may be defined by one subcarrier in the frequency domain and one orthogonal frequency division multiplexing (OFDM) symbol in the time domain. Twelve consecutive subcarriers in the frequency domain may compose a physical resource block (PRB). A resource element group (REG) may include one PRB in the frequency domain and one OFDM symbol in the time domain, for example, twelve resource elements. A control channel element (CCE) may represent a group of resources used to transmit PDCCH. One CCE may be mapped to a number of REGs, for example, six REGs.

The UE 104 may transmit data and control information to the gNB 108 using physical uplink channels. Different types of physical uplink channels are possible including, for instance, a physical uplink control channel (PUCCH) and a physical uplink shared channel (PUSCH). Whereas the PUCCH carries control information from the UE 104 to the gNB 108, such as uplink control information (UCI), the PUSCH carries data traffic (e.g., end-user application data) and can carry UCI.

The UE 104 and the gNB 108 may perform beam management operations to identify and maintain desired beams for transmission in the uplink and downlink directions. The beam management may be applied to both PDSCH and PDCCH in the downlink direction, and PUSCH and PUCCH in the uplink direction.

In an example, communications with the gNB 108 and/or the base station can use channels in the frequency range 1 (FR1) band, frequency range 2 (FR2) band, and/or high frequency range (FRH) band. The FR1 band includes a licensed band and an unlicensed band. The NR unlicensed band (NR-U) includes a frequency spectrum that is shared with other types of radio access technologies (RATs) (e.g., LTE-LAA, WiFi, etc.). A listen-before-talk (LBT) procedure can be used to avoid or minimize collision between the different RATs in the NR-U, whereby a device should apply a clear channel assessment (CCA) check before using the channel.

As further illustrated in FIG. 1, the network environment 100 may further include a base station 112 with which the UE 104 may also connect. The base station 112 supports the same RAT as the gNB 108 (e.g., the base station 112 is also a gNB). Additionally or alternatively, the base station 112 supports a different RAT (e.g., Long-Term Evolution (LTE) eNB).

In an example, the UE 104 supports carrier aggregation (CA), whereby the UE 104 can connect and exchange data simultaneously over multiple component carriers (CCs) with the gNB 108 and/or the base station 112. The CCs can belong to the same frequency band, in which case they are referred to as intra-band CCs. Intra-band CCs can be contiguous or non-contiguous. The CCs can also belong to different frequency bands, in which case they are referred to as inter-band CCs. A serving cell can be configured for the UE 104 to use a CC. A serving cell can be a primary (PCell), a primary secondary cell (PSCell), or a secondary cell (SCell). Multiple SCells can be activated via an SCell activation procedures where the component carriers of these serving cells can be intra-band contiguous, intra-band nooncontiguous, or inter-band. The serving cells can be collocated or non-collocated.

The UE 104 can also support dual connectivity (DC), where it can simultaneously transmit and receive data on multiple CCs from two serving nodes or cell groups (a master node (MN) and a secondary node (SN)). DC capability can be used with two serving nodes operating in the same RAT or in different RATs (e.g., an MN operating in NR, while an SN operates in LTE). These different DC modes include, for instance, evolved-universal terrestrial radio access-new radio (EN)-DC, NR-DC, and NE-DC (the MN is a NR gNB and the SN is an LTE eNB).

Figure 2:
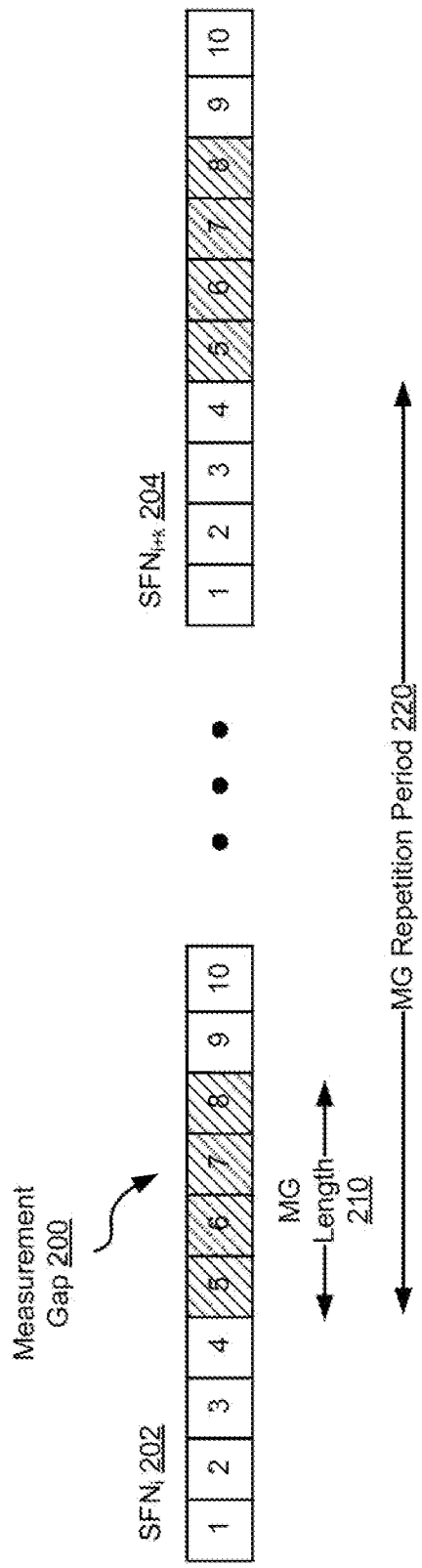
FIG. 2 illustrates an example of a measurement gap, in accordance with some embodiments.

FIG. 2 illustrates an example of a measurement gap 200, in accordance with some embodiments. Generally, a UE, such as the UE 104 of FIG. 1, needs to measure reference signals (e.g., SSBs) on neighboring cell signals and other component carriers using its RF circuitry. Such measurements can impact data transmission and/or reception with a serving cell, where such data transmission and/or reception relies on the RF circuitry. For inter-frequency and/or other RAT reference signal measurements, the UE stops the data transmission and/or reception and retunes its RF circuitry to configured frequencies (e.g., according to configured measurement object(s)). After the measurements, the UE can again retune its RF circuitry to then resume the data transmission and/or reception with the serving cell. A time duration for both retunings and during which the reference signals can be received and the data transmission and/or reception stopped can be defined as the measurement gap 200.

A measurement gap configuration can be defined for the measurement gap 200 and signaled from the network to the UE. As illustrated in FIG. 2, the measurement gap configuration includes a measurement gap length 210 and a measurement repetition period 220, although additional measurement gap parameters are possible. The measurement gap length 210 can represent the length of measurement gap. This length can be a time duration expressed in milliseconds (or some other unit). The measurement gap repetition period 220 can represent the periodicity (e.g., in milliseconds or some other unit) at which the measurement gap 200 repeats. The measurement gap length 210 and the measurement repetition period 220 can jointly represent a measurement gap pattern. The network can refer to the measurement gap pattern with a measurement gap pattern index "m." Other measurement gap parameters include, for instance, a measurement gap timing advance, which can represent a time duration by which the UE advances the start of the measurement gap (e.g., by moving ahead the start of the RF circuit retuning).

As further illustrated in FIG. 2, a frame structure is shown. Generally, a radio frame is ten milliseconds long and can be referred to with a system frame number (SFN). FIG. 2 illustrates two radio frames, labeled as $SFN_i$ 202 and $SFN_{i+k}$ 204, with the three dots indicating that "k−1" radio frames exist between these two radio frames. Each radio frame includes ten sub-frames, each one millisecond long, (shown with the boxes numbered "1" through "10"). Each sub-frame includes a number of slots (not shown in FIG. 2). The length of a slot and the number of slots per sub-frame can depend on the subcarrier spacing (SCS). Different SCSs are possible, depending on the frequency range. SCS of fifteen, thirty, sixty, one-hundred and twenty, and two-hundred and forty kilohertz (KHz) are supported with FR1 and FR2 and are referred to with numerology "µ" of "0," "1," "2," "3," and "4." Additional SCSs can be supported with FRH including, for instance, four-hundred and eighty, nine-hundred and sixty, and one thousand nine-hundred and twenty KHz which can be referred to with numerology "µ" of "5," "6," and "7." The change in the subcarrier spacing allows flexibility around the length of a slot and the number of slots within a sub-frame. For example, the higher the numerology, the shorter the slot can be. The number of symbols within a slot does not change based on the subcarrier spacing but can change depending on the slot configuration type. For slot configuration 0, the number of symbols in a slot is fourteen. In comparison, for slot configuration 1, this number is seven.

In the illustrative example of FIG. 2, the measurement gap 200 occupies four sub-frames (e.g., sub-frame "5," "6," "7," and "8" shown with diagonally dashed boxes). The measurement gap 200 also repeats every "k" radio frames. In this illustration, the time duration of the measurement gap is four milliseconds (equal to four one-millisecond sub-frames). If "k" is four, the measurement gap repetition period is forty milliseconds (equal to four ten-millisecond radio frames).

Figure 3:
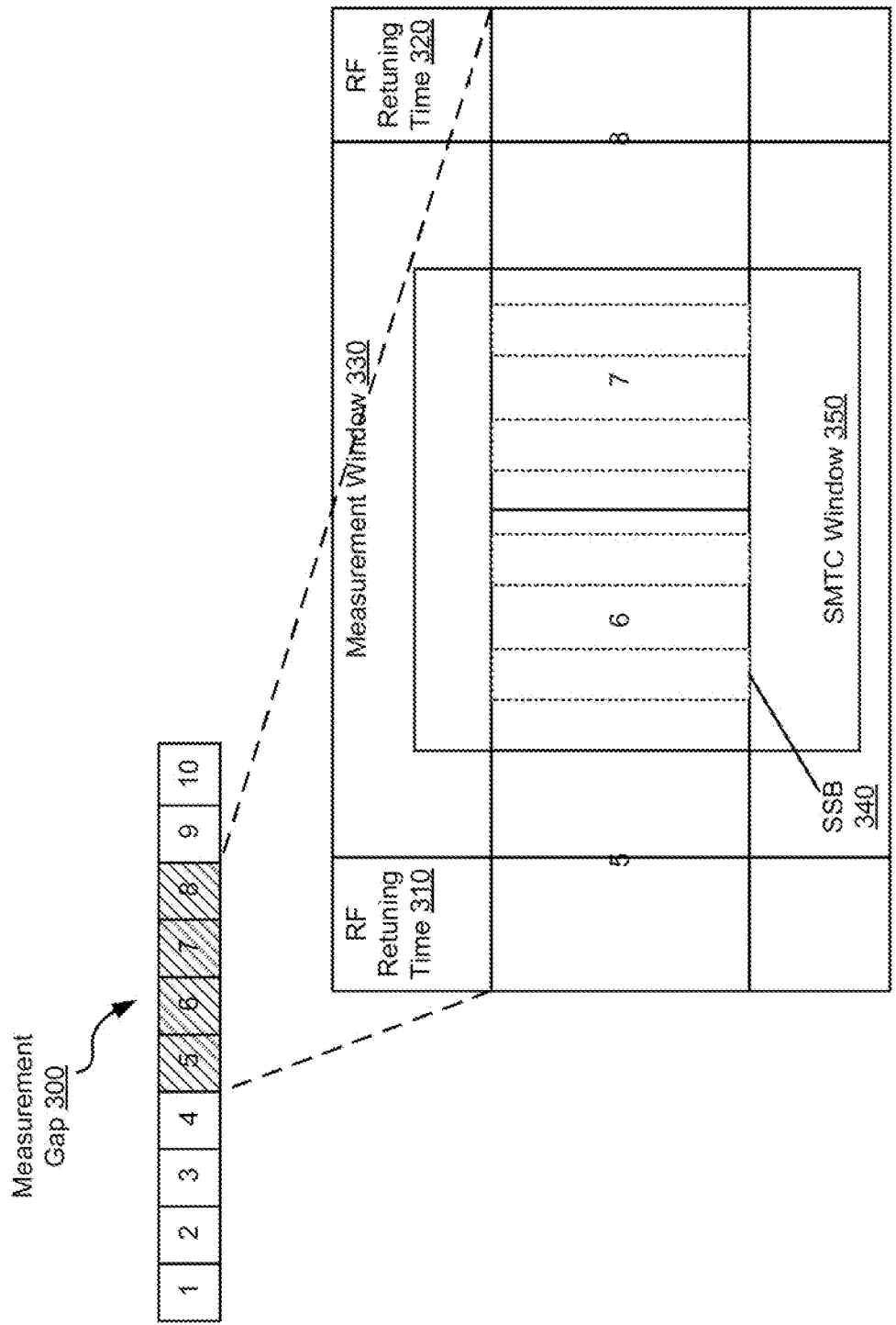
FIG. 3 illustrates an example of radio frequency (RF) retuning times and a measurement window that form a measurement gap, in accordance with some embodiments.

FIG. 3 illustrates an example of RF retuning times 310 and 320 and a measurement window 330 that form a measurement gap 300, in accordance with some embodiments. In the illustrative example, data and/or other singling information can be transmitted and/or received during sub-frames "1" through "4" and "9" through "10" of a radio-frame, whereas the measurement gap 300 corresponds to sub-frames "5" through "8" of the radio frame. The make-up of the measurement gap includes a first RF retuning time 310, a second RF retuning time 320, and the measurement window 330. The first RF retuning time 310 represents the time needed to retune the RF circuitry of a UE from the transmission/reception at sub-frame "4" to the reception of RS signals (e.g., SSBs 340) during the measurement window 330. Conversely, the second RF retuning time 320 represents the time needed to retune back the RF circuitry to resume the transmission/reception at sub-frame "9." These retuning times 310 and 320 can be referred to as switching time to indicate that the UE's operations are switching (e.g., between the transmission/reception and the RS reception). The measurement window 330 can represent a window of time during which the references signals are expected, where these signals are to be measured by the UE. In an example, the reference signals are SSBs. In this case, the measurement window 330 includes an SSB-based RRM measurement timing configuration (SMTC) window 340. SSBs can be scheduled by the network and received by the UE at different slots (or, more specifically, sets of resource elements including symbols in the time domain) within the sub-frames "5" through "8." Generally, the SMTC window 350 (and to that effect the measurement window 330) do not overlap with the switching times.

Figure 4:
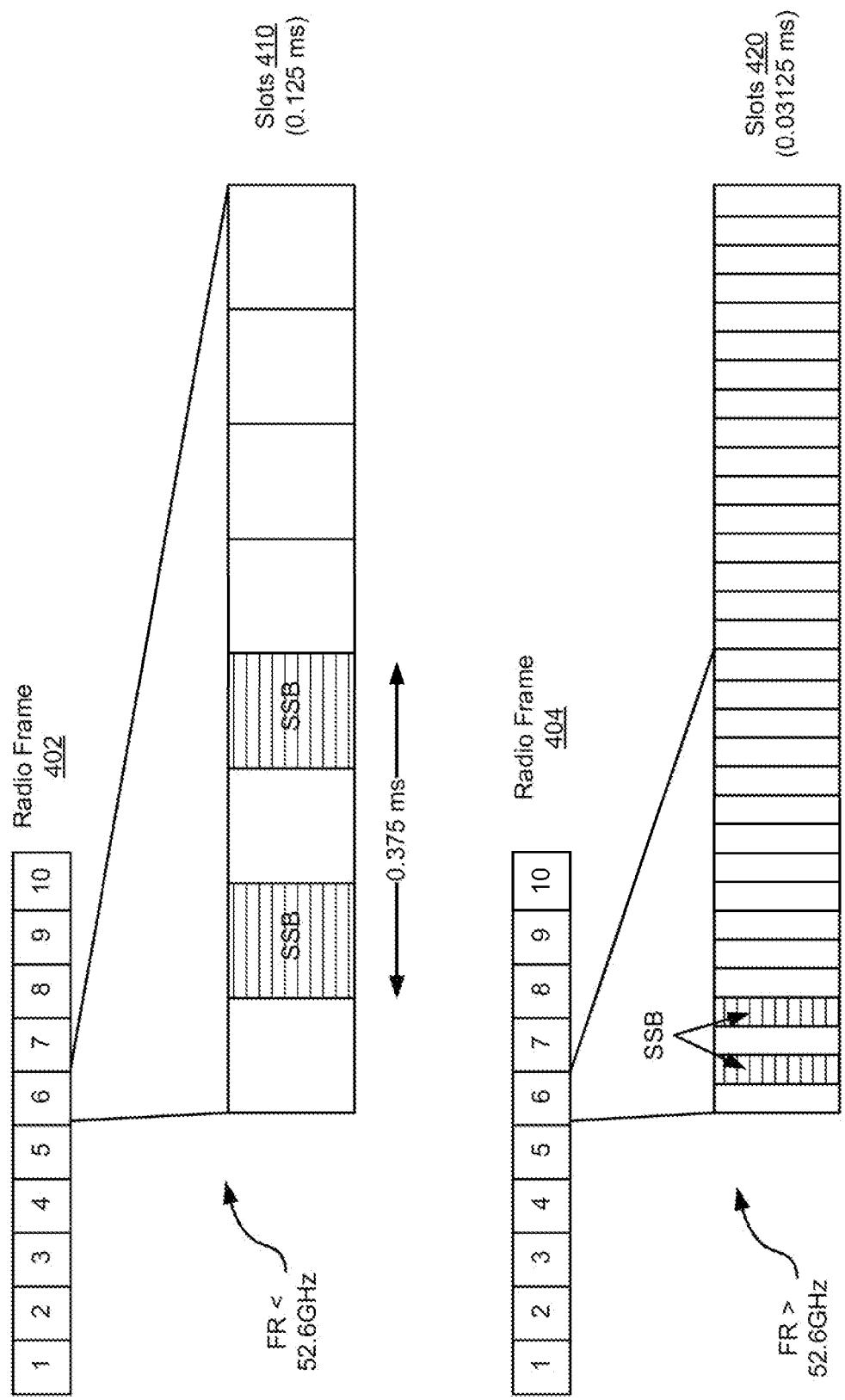
FIG. 4 illustrates an example of a comparison between measurement gaps that change dependently on frequency ranges, in accordance with some embodiments.

FIG. 4 illustrates an example of a comparison between measurement gaps that change dependently on frequency ranges, in accordance with some embodiments. As explained herein above, with the high frequency range (FRH), the SCS can be increased (e.g., with the numerologies "5," "6," or "7"), resulting in shorter slots and/or shorter symbols. Because reference signals (e.g., SSBs) are encoded in the slots (or resource elements distributed in the time domain in one or more symbols of slot(s)), the measurement gap configuration used for FRH can be made different than that of FR1 and/or FR2 (e.g., the measurement gap duration can be made shorter and/or the measurement gap repetition period can be made shorter).

The top part of FIG. 4 illustrates a radio frame 402 used in a channel with a frequency range having frequencies smaller than 52.6 GHz (e.g., FR2). For illustrative purposes only, the numerology is "3," corresponding to a one-hundred and twenty KHz SCS and eight slots 410 per sub-frame, each of the slots 410 being 0.125 milliseconds long. Other frame structures are possible. Two SSBs are sent for measurement by a UE and, as shown with the horizontally dashed boxes, are sent in two out of the eight slots 410 and are separated by a slot. A measurement gap is defined to include an SMTC window that is at least three-slots long (e.g., including the two "SSB slots" and the "in-between slot") or 0.375 ms.

In comparison, the bottom part of FIG. 4 illustrates a radio frame 404 used in a channel with a frequency range having frequencies equal to or larger than 52.6 GHz (e.g., FR2). For illustrative purposes only, the numerology is "5," corresponding to a four-hundred and eighty KHz SCS and thirty-two slots 420 per sub-frame, each of the slots 420 being 0.03125 milliseconds long. Other frame structures are possible. Here also two SSBs are sent for measurement by the UE, as shown with the horizontally dashed boxes, and are separated by a slot. A measurement gap is defined to include an SMTC window that is at least three-slots long (e.g., including the two "SSB slots" and the "in-between slot"). However, here the slots carrying the SSBs are much shorter, and the time length corresponding to the three slots is 0.09375 milliseconds.

In light of the above comparison, it is possible to define a shorter measurement gap for communications in the high frequency range (FRH) relative to communications in FR1 and FR2. Otherwise, the measurement gap may be unnecessarily long and may result in a wasted opportunity to improve the communications throughput.

Figure 5:
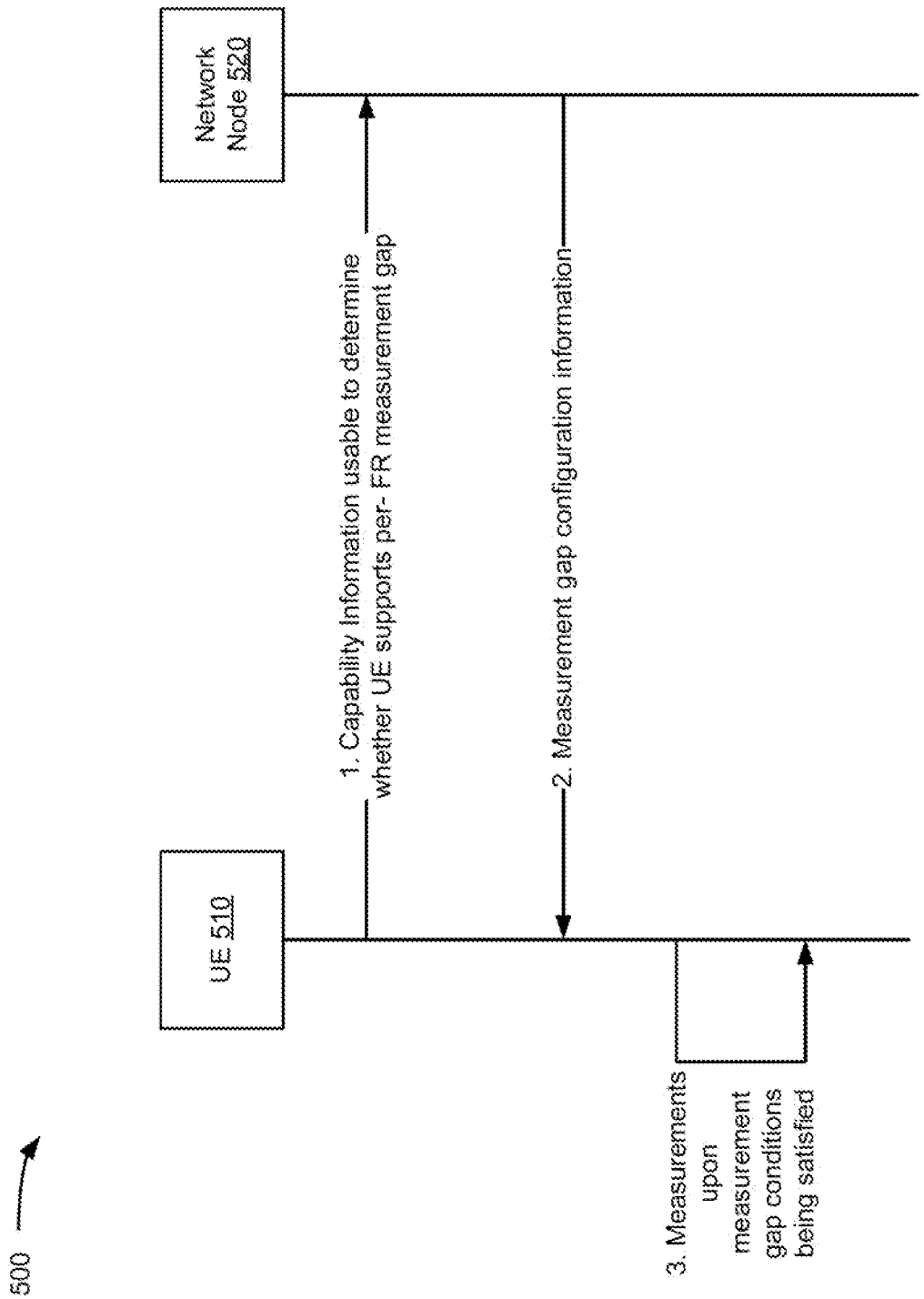
FIG. 5 illustrates an example of a sequence diagram between a user equipment (UE) and a network node associated with using measurement gap configurations, in accordance with some embodiments.

FIG. 5 illustrates an example of a sequence diagram 500 between a UE 510 and a network node 520 associated with using measurement gap configurations, in accordance with some embodiments. The network node 520 can be a master node or a secondary node and can include a gNB or an eNB depending on the connectivity mode (e.g., EN-DC, NR-DC, NE-DC, NR standalone (SA), or the like). During a UE attach (not shown in FIG. 5), after a radio bearer is set up, the network node 520 sends measurement gap configurations to the UE 510 based on the mobility trigger and policy settings. The measurement gap configurations can be included in the RRC Reconfiguration signaling and/or the RRC Resume signaling.

In an example, the sequence diagram 500 includes the UE 510 sending capability information to the network node 520, where this capability information is usable to determine whether the UE supports a per-FR measurement gap. For example, the UE 510 indicates to the network node 520 whether the UE 510 supports a measurement gap for a high frequency range (FRH) in addition to, in combination with any, or alternative to a measurement gap for FR1 and a measurement gap for FR2. If the per-FR measurement gap is not supported, the UE 510 indicates the lack of support and, by default, the network node 520 determines that the UE 510 supports only a per-UE measurement gap. Alternatively, the UE 510 can indicate that it only supports the per-UE measurement gap. Different approaches are possible and can use one or more information elements (IEs) and/or other messages to indicate whether a per-FR measurement gap is supported, including for the high frequency range (FRH).

In a first example approach, the capability information is a single indication of whether the UE is capable of supporting at least three measurement gap configurations that correspond to the three frequency ranges FR1, FR2, and FRH. For instance, the UE 510 sends an "independentGapConfig" indication. "independentGapConfig" can be defined in a technical specification as a field that indicates whether a UE supports three independent measurement gap configurations for FR1, FR2 and FRH (e.g., FR3 or FR2x). The field also indicates whether the UE supports the FR2 inter-RAT measurement without gaps when (NG)EN-DC is not configured and whether the UE supports the FRH inter-RAT measurement (FRH to measure LTE/3G/2G) without gaps when (NG)EN-DC is not configured.

In a second example approach, the capability information includes first capability information and second capability information. The first capability information indicates whether the UE 510 is capable of supporting two measurement gap configurations that correspond to two out of the three frequency ranges (e.g., any pair of (FR1, FR2), (FR1, FRH), or (FR2, FRH)). The second capability information indicates whether the UE 510 is capable of supporting three measurement gap configurations that correspond to the three frequency ranges FR1, FR2, and FR3. The second capability information is set to indicate that the UE 510 is capable of supporting the three measurement gap configurations only if the first capability information is set to indicate that the UE 510 is capable of supporting the two measurement gap configurations. For instance, the first capability information is "independentGapConfig" indicating whether a UE supports two independent measurement gap configurations for FR1 and FR2; or FR1 and FRH, or FR2 and FRH. If independentGapConfig is not supported, that means the UE only supports per-UE measurement gap. The second capability information is a "new_independentGapConfig" that indicates whether the UE supports three independent measurement gap configurations for FR1, FR2 and FRH. This field only applies when "independentGapConfig" is set to "support."

In a third example approach, the capability information includes first capability information and second capability information. The first capability information is common to FR1 and FR2 and indicates whether the UE 510 is capable of supporting a first measurement gap configuration for the FR1 and a second measurement gap configuration for FR2. The second capability information is specific to FRH and indicates whether the UE 510 is capable of supporting a third measurement gap configuration for FRH. The second capability information is set to indicate that the UE 510 is capable of supporting the third measurement gap configuration only if the first capability information is set to indicate that the UE 510 is capable of supporting the first measurement gap configuration and the second measurement gap configuration. For instance, the first capability information is "independentGapConfig" indicating whether a UE supports two independent measurement gap configurations for FR1 and FR2. The second capability information is an "FRHGapConfig" indicating whether UE can support an FRH measurement gap. If the "independentGapConfig" indicates the UE can only support per-UE measurement gap, then "FRHGapConfig" can be either "false" or "not configured" (no support of FRH measurement gap). If "independentGapConfig" indicates the UE can support per-FR measurement gap, then "FRHGapConfig" indicates whether the UE can support two independent measurement gap configurations for FR1 and FR2 or the UE can support three independent measurement gap configurations for FR1, FR2, and FRH. In particular, if "FRHGapConfig" is set to true, then the indication is that the UE supports independent measurement gaps for FR1, FR2 and FR3. In comparison, if "FRHGapConfig" is set to false, then the indication is that the UE supports independent measurement gaps only for FR1 and FR2.

In a fourth example approach, the capability information includes measurement gap capability information and band combination capability information. The measurement gap capability information indicates whether the UE 510 is capable of supporting at least two measurement gap configurations (e.g., any pair of (FR1, FR2), (FR1, FRH), or (FR2, FRH) or all three FR1, FR2, and FRH). The band combination capability information indicates whether the UE 510 is capable of supporting at least two band combinations. The measurement gap capability information and the band combination capability information jointly indicate supported measurement gap configurations. For instance, the capability information is "independentGapConfig" indicating whether a UE supports measurement gap configurations for FR1 and FR2 (but no such indication is available for FRH in this "independentGapConfig"). If "independentGapConfig" is not supported, then the UE only supports per-UE measurement gap. Otherwise, if the UE supports FR1+FR2+FRH band combinations (as indicated by the band combination capability information), then "independentGapConfig" set to supported means that the UE can support three independent measurement gap configurations for FR1, FR2, and FRH. In comparison, if the UE supports FR1+FR2, or FR1+FRH, or FR2+FRH band combinations, then independentGapConfig" set to supported means that the UE can support two independent measurement gap configurations for FR1+FR2, or FR1+FRH, or FR2+FRH, respectively, which can depend on the signaled band combination capability information.

In a fifth example approach, the capability information includes a bitmap indicating the UE's 510 support per frequency range of a corresponding measurement gap configuration. The bitmap can be signaling indicating which perFR measurement gap is supported. For instance, the bitmap can include three bits, the first bit corresponding to FR1, the second bit to FR2, and the third bit to FRH. A "0" value of a bit indicates that the corresponding per-FR measurement gap is not supported. A "1" value of a bit indicates that the corresponding per-FR measurement gap is supported. All "0" bits indicates that the UE can only support a per-UE measurement gap.

In a sixth example approach, the capability information includes an IE per frequency range indicating the UE's 510 support of a measurement gap configuration for the frequency range. Individual IEs can be used, one for FR1, one for FR2, and one for FRH. Each can indicate the support (or lack thereof) of an FR1 measurement gap, an FR2 measurement gap, and an FRH measurement gap, respectively.

In an example, the sequence diagram 500 also includes the network node 520 sending to the UE 510 information about one or more measurement gap configurations based on the capability information. The information can be sent via RRC signaling. The RRC signaling can depend on the communications mode. For instance, in (NG)EN-DC or NE-DC, the per-FRH measurement gap "gapFRH" can only be set up by NR RRC (e.g., LTE RRC cannot configure the measurement gap for the FRH frequency range). In NR-DC, "gapFRH" can only be set up in the measConfig associated with the master cell group.

Generally, if the UE 510 supports per-UE measurement gap only, the network node 520 only configures a per-UE measurement gap. If the UE 510 supports per-FRH measurement gap but no per-FR1 measurement gap and no per-FR2 measurement gap, the network node 520 configures a per-UE measurement gap usable for FR1 and FR2 and per-FRH measurement gap usable for FRH. The per-UE measurement gap can be used for FRH instead of the per-FRH measurement gaps based on measurement objects and serving cells, as further described herein below. If the UE supports per-FR measurement gap only for a pair of frequency ranges (e.g., (FR1, FR2), (FR1, FRH), or (FR2, FRH)), the network node 520 configures per-FR measurement gaps for the two supported frequency ranges and a per-UE measurement gap usable for the remaining frequency range. If the UE supports per-FR for all frequency ranges (e.g. FR1, FR2, and FRH), the network node 520 configures per-FR measurement gaps for all three supported frequency ranges.

A measurement gap configuration can be a "gapFR1" for the FR1 frequency range, a "gapFR2" for the FR2 frequency range, a "gapFRH" for the FRH frequency range, and a "gapUE" for the per-UE measurement gap. Generally, a measurement gap configuration includes different parameters of a measurement gap, such as a measurement gap length, a measurement gap repetition, and a measurement gap timing advance. Additionally or alternatively, the measurement gap configuration can include a measurement gap pattern index "m," from which at least some of the measurement gap parameters (e.g., a measurement gap pattern that includes the measurement gap length and the measurement gap repetition period) can be derived.

Specific to a measurement gap configuration for the FRH frequency range (e.g., including frequencies equal to and/or larger than 52.6 GHz), a value of the measurement gap pattern index "m" is larger than twenty-five (e.g., twenty-six and on) and is used to indicate the measurement gap pattern for FRH. Values smaller than or equal to twenty-five can be associated with the frequency ranges having frequencies smaller than 52.6 GHz (e.g., FR1 and FR2) and can indicate the measurement gap patterns for such frequency ranges.

Multiple measurement gap patterns can be defined for the FRH frequency range. Each of such patterns can represent a combination of measurement gap length (MGL) and measurement gap repetition period (MGRP), where this combination is associated with a particular value (larger than twenty-five) of the measurement gap pattern index "m." At least one of the measurement gap length and measurement gap repetition period is based on the frequencies of FRH being equal to or larger than 52.6 GHz. For instance, and referring back to FIG. 4, such frequencies may use SCS larger than two-hundred and forty KHz and, as such, can be associated with a shorter measurement gap length to increase the communications throughput. Similarly, the measurement gap repetition period can be made shorter.

In an example, the measurement gap length includes two switching times (e.g., corresponding to the two RF retuning times 310 and 320 of FIG. 3) and a measurement gap duration (e.g., corresponding to the measurement window 330 of FIG. 3). The switching times can be equal to each other and can be set to "$0.25/2^k$" milliseconds, where "k=0, 1, or 2" and "$2^k$" is two to the power of "k." The use of "k" equal to "1" or "2" represents a decrease by at least fifty-percent or seventy-five percent of a switching time relative to the switching time used for FR1 and FR2 that typically use a 0.25 milliseconds value. The specific value(s) of "k" can be defined in a technical specification and stored by the UE 510 according to the technical specification. The measurement gap duration can be chosen from a set of {5, 3, 1, y} milliseconds, where "y" is smaller than one milliseconds. For instance, "y" is equal to 0.5, 0.25, or 0.125 milliseconds. Here also, the specific value(s) of "y" can be defined in a technical specification and stored by the UE 510 according to the technical specification. The measurement gap length is set as:

$$MGL = 2*\text{switching time} + \text{measurement gap duration} = 2*\left(\frac{0.25}{2^k}\right) + \text{measurement gap duration},$$

where "k=0, 1, or 2" and "y=0.5, 0.25, or 0.125."

In an example, the measurement gap repetition can be set to "$20/2^j$" milliseconds, where "j=0, 1, or 2" and "$2^j$" is two to the power of "j." The use of "j" equal to "1" or "2" represents a decrease by at least fifty-percent or seventy-five percent of a repetition period used for FR1 and FR2. The specific value(s) of "j" can be defined in a technical specification and stored by the UE 510 according to the technical specification.

Based on these two definitions of the measurement gap length and the measurement gap repetition, the following table can be defined for the FRH frequency range. This table associates the measurement gap pattern index "m" with the measurement gap length and the measurement gap repetition, where the value of "m" is larger than twenty-five. The table can be defined in a technical specification and stored by the UE 510 according to the technical specification.

| Gap Pattern Id | Measurement Gap Length (MGL, ms) | Measurement Gap Repetition Period (MGRP, ms) |
|---|---|---|
| m > 25 | $2*\left(\dfrac{0.25}{2^k}\right)$ + measurement gap duration), $k = 0, 1, \text{ or } 2$ | $20/2^j$, j = 0, 1, or 2 |

In addition, the measurement gap timing advance (MGTA) can be defined based on the switching time definition above. For instance, the measurement gap timing advance can be equal to zero milliseconds (when the network node 520 indicates that no timing advance is to be applied to a measurement gap) or, otherwise, equal to "$0.25/2^k$" milliseconds.

As indicated above, the measurement gap parameters, including the measurement gap length, the measurement gap repetition period, and the measurement gap timing advance can be included in the RRC signaling. An example of this approach is provided below, where MGL, MGRP, and the switching time are based on the above definitions.

| Gap Pattern Id | Measurement Gap Length (MGL, ms) | Measurement Gap Repetition Period (MGRP, ms) |
|---|---|---|
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |

```
-- ASN1START
-- TAG-MEASGAPCONFIG-START
MeasGapConfig ::=        SEQUENCE {
    gapFR2               SetupRelease
{ GapConfig }            OPTIONAL, -- Need M
    ...,
    [[
    gapFR1               SetupRelease
{ GapConfig }            OPTIONAL, -- Need M
    gapFR3               SetupRelease
{ GapConfig }            OPTIONAL, -- Need M
    gapUE                SetupRelease
{ GapConfig }            OPTIONAL -- Need M
    ]]
}
GapConfig ::=            SEQUENCE {
    gapOffset            INTEGER (0..159),
    mgl                  ENUMERATED {ms1dot5, ms3, ms3dot5, ms4, ms5dot5, ms6, MGL},
    mgrp                 ENUMERATED {ms20, ms40, ms80, ms160, MGRP},
    mgta                 ENUMERATED {ms0, ms0dot25, ms0dot5, },
    ...,
    [[
    refServCellIndicator  ENUMERATED {pCell, pSCell, mcg-FR2, switching time } OPTIONAL -- Cond NEDCorNRDC
    ]],
    [[
    refFR2ServCellAsyncCA-
r16 ServCellIndex        OPTIONAL, -- Cond AsyncCA
    mgl-r16              ENUMERATED {ms10,
ms20}                    OPTIONAL -- Cond PRS
    ]]
}
-- TAG-MEASGAPCONFIG-STOP
-- ASN1STOP
```

Also as indicated above, the RRC signaling can additionally or alternatively include a measurement gap index "m." An example of this approach is provided below, where "m" would be signaled to have one or more of the values between "0" and "37." The values for "m" larger than twenty-five are derived from the above MGL and MGRP definitions above with "k" equal to one and "y" equal to 0.5 milliseconds and are applicable to the FRH frequency range.

-continued

| Gap Pattern Id | Measurement Gap Length (MGL, ms) | Measurement Gap Repetition Period (MGRP, ms) |
|---|---|---|
| 21 | 1.5 | 40 |
| 22 | 1.5 | 80 |
| 23 | 1.5 | 160 |

-continued

| Gap Pattern Id | Measurement Gap Length (MGL, ms) | Measurement Gap Repetition Period (MGRP, ms) |
|---|---|---|
| 24 | 10 | 80 |
| 25 | 20 | 160 |
| 26 | 5.25 | 20 |
| 27 | 5.25 | 10 |
| 28 | 5.25 | 5 |
| 29 | 3.25 | 20 |
| 30 | 3.25 | 10 |
| 31 | 3.25 | 5 |
| 32 | 1.25 | 20 |
| 33 | 1.25 | 10 |
| 34 | 1.25 | 5 |
| 35 | 0.75 | 20 |
| 36 | 0.75 | 10 |
| 37 | 0.75 | 5 |

In the above two steps of the sequence diagram 500, a description is provided for signaling the UE capability and the measurement gap configuration. When FRH is FR3, the UE capability signaling can be specific to FR1, FR2, and FR3. Further, a per-FR measurement gap can be configured for each of FR1, FR2, and FR3. When FRH is FR2x, the UE capability signaling can be specific to FR1 and FR2, where the FR2 signaling also applies to FR2x. In this case, a per-FR measurement gap can be configured for each of FR1 and FR2, where the measurement gap for FR2 signaling extends to FR2x and includes the MGL, MGRP and MGTA defined herein above (e.g.

$$MCL = 2*\left(\frac{0.25}{2^k}\right) + \text{measurement gap duration}\right), k = 0,$$

$$1, \text{ or } 2, MGRP = 20/2^j, j = 0, 1, \text{ or } 2, MGTA = \frac{0.25}{2^k}\right).$$

Although not illustrated in FIG. 5, the network node 520 can provide additional configuration information related to a measurement gap via, for instance, RRC signaling. This information can be generally referred to as "measurement configuration" and can include the measurement gap configuration(s). The measurement configuration can configure the UE 510 to perform NR measurements and/or inter-RAT measurements. The measurement configuration can also configure the UE 510 to report measurement information based on SSB and CSI-RS resources, measurement result per SSB, measurement result per cell based on SSB(s), SSB indexes, measurement result per CSI-RS resource, measurement result per cell based on CSI-RS resource(s), and/or CSI-RS resource measurement identifiers. For instance, the measurement configuration can additionally include measurement objects (MOs), reporting configurations, measurement identities (Meas ID), and quantity configurations. The MOs provide a list of objects on which the UE 510 is to perform the intra-frequency and inter-frequency measurements. An MO indicates the frequency/time location and sub-carrier spacing of RSs to be measured.

In an example, the sequence diagram 500 also includes the UE 510 performing measurements on RSs (e.g., SSBs and/or CSI-RSs) upon measurement gap conditions being satisfied. This step represents a behavior of the UE 510, where the UE performs measurements by using the configured measurement gap(s) depending on configured MOs and the serving cell(s) with which the UE 510 may be communicating.

Referring to a per-FRH measurement gap (e.g., "FRHgap"), this gap may be used in EN-DC, NR-DC, NE-DC, and NR SA UE as follows. If the UE 510 has an FRH serving cell and can support "FRHgap," this per-FRH measurement gap can be used when the configured MOs include FRH MO(s). The use of "FRHgap" can be limited to FRH measurements and transmission/reception (e.g., related to data) on FRH serving cell(s). The use of "FRHgap" cannot be for FR2 or FR1 measurements or interruptions on FR2 or FR1 serving cells. Even when the UE 510 is configured with "FRHgap," if the configured MOs do not include FRH MO(s), then no measurement gap would be applied to an FRH serving cell and no data interruption would be applied to FRH serving cells.

If the UE 510 can only support per-UE measurement gap (e.g., "UEgap"), one of the two scenarios could be supported. In a first scenario, when the UE 510 has no serving cell in FR1 or FR2 but has serving cell(s) only in FRH, and the configured MOs include only FRHMO(s), the FRH MG pattern (with the measurement gap pattern index "m" where the value of "m" is larger than twenty-five) can be used as the "UEgap" (e.g., the "UE" gap is set to have the MGL and MGRP associated with the value of "m") to perform FRH measurements and interrupt transmission and/or reception (e.g., for data) of FRH serving cell(s). Otherwise, in a second scenario, the FRH measurement gap pattern (e.g., as derived from the value of "m") cannot be used as the "UEgap" to apply to the serving cells. In other words, these two scenarios represent that the "UEgap" as configured by the network node 520 is used unless the serving cells of the UE 510 use the FRH frequency range only and the configured MOs for the UE are FRH MOs only, in which case the shorter "FRHgap" would be used (as derived from the value of "m"). This approach represent the strategy of using the longer "UEgap" unless only FRH communications are occurring.

Figure 6:
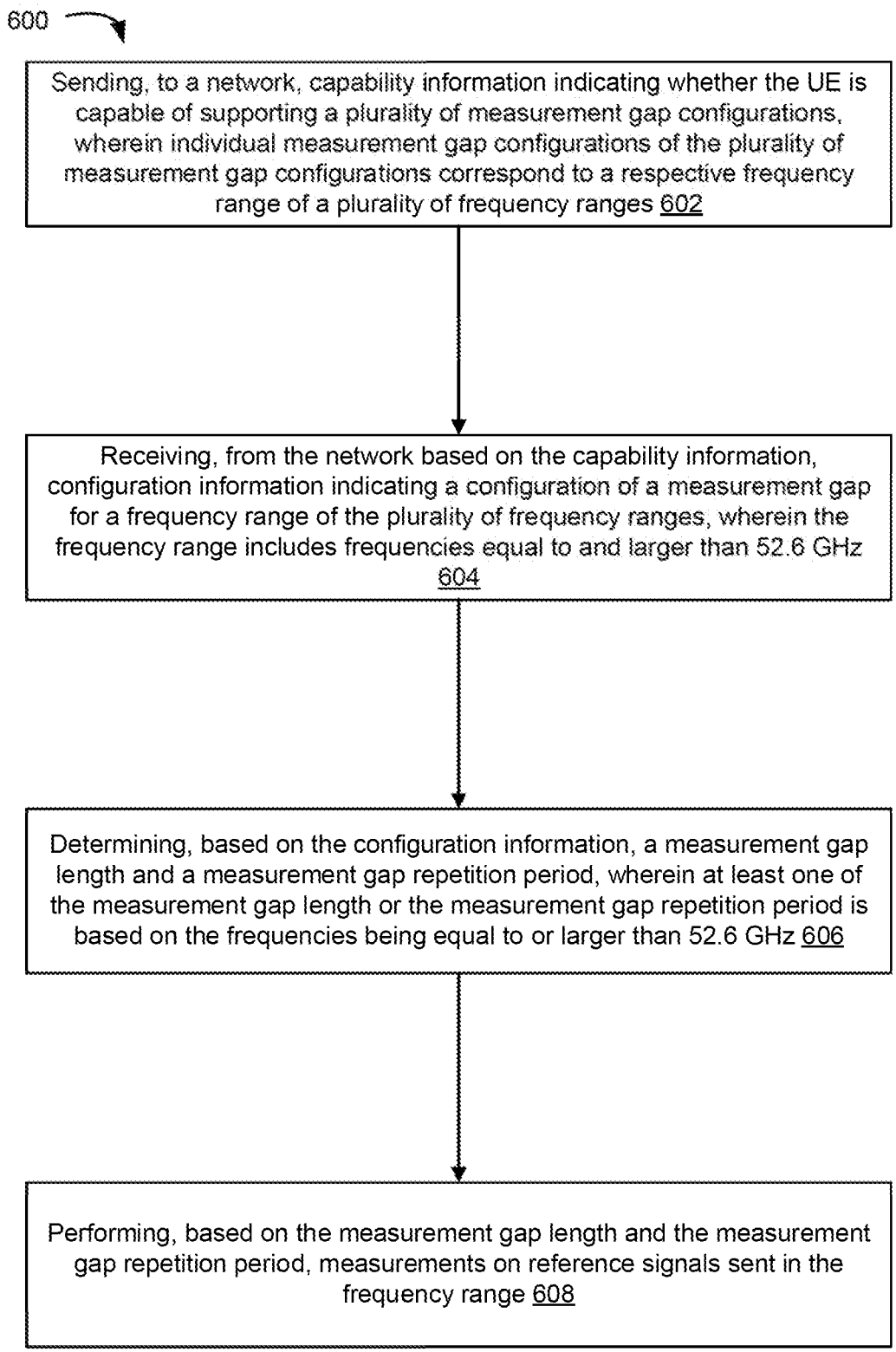
FIG. 6 illustrates an example of an operational flow/algorithmic structure for a UE using measurement gap configurations, in accordance with some embodiments.

FIG. 6 illustrates an example of an operational flow/algorithmic structure 600 for the UE using measurement gap configurations, in accordance with some embodiments. The UE can implement the operational flow/algorithmic structure 600 to determine and use a per-FR measurement gap, including an "FRHgap." The operation flow/algorithmic structure 600 may be performed or implemented by the UE such as, for example, the UE 104, 510, 900, or components thereof, for example, processors 904. The UE can communicate with a network (e.g., network nodes including, for instance, gNBs and/or eNBs) using a plurality of frequency ranges that include, FR1, FR2, and/or FRH.

The operation flow/algorithmic structure 600 may include, at 602, sending, to the network, capability information indicating whether the UE is capable of supporting a plurality of measurement gap configurations, wherein individual measurement gap configurations of the plurality of measurement gap configurations correspond to a respective frequency range of a plurality of frequency ranges. For example, an "FR1" gap corresponds to the FR1 frequency range, an "FR2gap" corresponds to the FR2 frequency range, and an "FR3gap" corresponds to the FRH frequency range. The UE can indicate its support for any, a combination, or all per-FR measurement gaps. If no support is provided, the UE can indicate its per-UE measurement gap support or the lack of per-FR measurement gap support. A single capability indication can be used per frequency range, a single capability indication can be used for a combination but not all three frequency ranges, a single capability indication can be used for all three frequency ranges, and/or a combination of measurement gap configuration capability indication and band combination capability information can be used.

The operation flow/algorithmic structure 600 may include, at 604, receiving, from the network based on the capability information or configuration information indicating a configuration of a measurement gap for a frequency range of the plurality of frequency ranges, wherein the frequency range includes frequencies equal to and larger than 52.6 GHz. For example, RRC signaling can be used to send the information to the UE. This information can indicate a measurement gap length, a measurement gap repetition period, and a measurement gap timing advance configuration for the measurement gap. This measurement gap can be, in an example, an "FRHgap." If additional measurement gap configurations are defined by the network for the UE, the UE can similarly receive information about each of the per-FR measurement gap configuration. The UE can also receive information about the per-UE measurement gap configuration.

The operation flow/algorithmic structure 600 may include, at 606, determining, based on the configuration information, the measurement gap length, and the measurement gap repetition period. At least one of the measurement gap length or the measurement gap repetition period is based on the frequencies being equal to or larger than 52.6 GHz. The measurement timing advance can also be determined based on the configuration information and may be set based on the frequencies being equal to or larger than 52.6 GHz. In an example, the RRC signaling directly indicates these parameters. In another example, the RRC signaling indicates a measurement gap pattern index "in," the value of which can be used to determine the parameters. Here also, if additional measurement gap configurations are defined by the network for the UE, the UE can similarly determine the measurement gap configuration parameters for each one of the per-FR measurement gaps or per-UE measurement gap.

The operation flow/algorithmic structure 600 may include, at 608, performing, based on the measurement gap length and the measurement gap repetition period, measurements on reference signals sent in the frequency range. For example, SSBs and/or CSI-RSs are received on channels in the FRH frequency range. Given the configured "FRHgap," the UE stops transmission/reception of data on FRH serving cells during the measurement gap length of "FRHgap" and at least performs SSB and/or CSIS-RS measurements. Thereafter, the UE resumes transmission/reception of data on the FRH serving cells until the next measurement gap occurrence that is based on the measurement gap repetition period. Here also, if additional measurement gap configurations are defined by the network for the UE, the UE can similarly perform measurements on reference signals sent on channels in the other frequency ranges (e.g., FR1 and/or FR2) based on the corresponding per-FR measurement gap or on the per-UE measurement gap. Generally, the behavior of the UE depends on the configured MOs (e.g., whether they include FR1 MOs, FR2 MOs, and/or FRH MOs), the serving cells (e.g., whether they use the FR1 frequency range, the FR2 frequency range, and/or the FR3 frequency range), and the configured measurement gap(s). Particularly, the UE can perform measurements on reference signals sent using channel(s) in a frequency range if a per-FR measurement gap is configured for that frequency range (or, otherwise, the per-UE measurement gap can be used), MOs for that frequency range are defined, and the UE cannot interrupt data transmission/receptions on serving cells that use the other frequency range(s).

Figure 7:
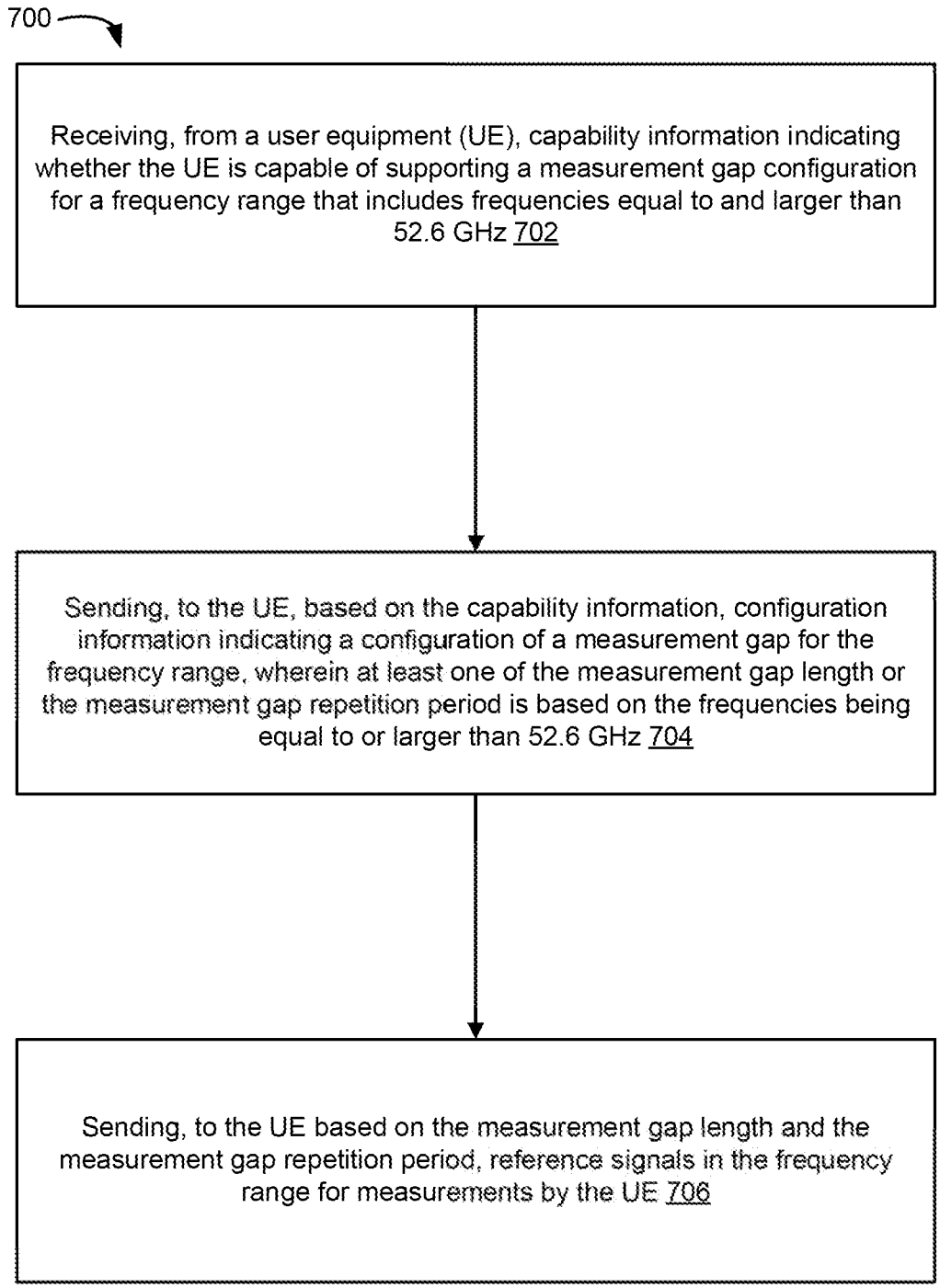
FIG. 7 illustrates an example of an operational flow/algorithmic structure for a network node for setting up measurement gap configurations, in accordance with some embodiments.

FIG. 7 illustrates an example of an operational flow/algorithmic structure 700 for a network node for setting up measurement gap configurations, in accordance with some embodiments. The network node can implement the operational flow/algorithmic structure 700 to define a per-FR measurement gap for a UE, including an "FRHgap." The operation flow/algorithmic structure 700 may be performed or implemented by the network node such as, for example, the gnB 108, the network node 520, gNB 900, or components thereof, for example, processors 1004, a base station of a different type, or a radio network core. The UE can communicate with a network that includes the network node using a plurality of frequency ranges that include, FR1, FR2, and/or FRH.

The operation flow/algorithmic structure 700 may include, at 702, receiving the UE capability information indicating whether the UE is capable of supporting a measurement gap configuration for a frequency range that includes frequencies equal to and larger than 52.6 GHz. For example, this frequency range is a high frequency range (FRH). The capability information indicates whether the UE supports an "FRHgap." As described herein above, the capability information can also indicate whether the UE supports per-FR measurement gap for FR1 and/or FR2 or whether only a per UE-measurement gap is supported. A single capability indication can be used per frequency range, a single capability indication can be used for a combination but not all three frequency ranges, a single capability indication can be used for all three frequency ranges, and/or a combination of measurement gap configuration capability indication and band combination capability information can be used.

The operation flow/algorithmic structure 700 may include, at 704, sending, to the UE, based on the capability information and configuration information indicating a configuration of a measurement gap for the frequency range, wherein at least one of the measurement gap length or the measurement gap repetition period is based on the frequencies being equal to or larger than 52.6 GHz. The configuration information can be sent via, for instance, RRC signaling and can include, for example, a measurement gap length, a measurement gap repetition period, and/or a measurement gap timing advance for the measurement gap (e.g., "FRHgap"). The configuration information can additionally or alternatively include a measurement gap index pattern "in" for the measurement configuration, where the value of "m" is larger than twenty-five. Similar configuration information can be sent for "FR1 gap," "FR2gap," and "UEgap." Generally, if the UE supports a per-FR measurement gap, the configuration information for the corresponding frequency range is defined and sent to the UE. If no per-FR measurement gap is supported, the configuration information is specific to the "UEgap." In this case, the measurement gap index pattern "m" can also be sent, where the value of "m" is larger than twenty-five, and where the corresponding measurement gap pattern is used instead of the "UEgap" depending on the configured MOs and the serving cells as described herein above in connection with FIG. 5. The configuration information can include other information types that relate to the measurement gap(s) including, for instance, configured MOs, reporting configurations, measurement identities, and/or quantity configurations.

The operation flow/algorithmic structure 700 may include, at 706, sending, to the UE based on the measurement gap length and the measurement gap repetition period and reference signals in the frequency range for measurements by the UE. For example, the network node schedules and sends SSBs and/or CSI-RSs to the UE, whereby the scheduling of these reference signals depend on the measurement gap length and the measurement gap repetition period.

Figure 8:
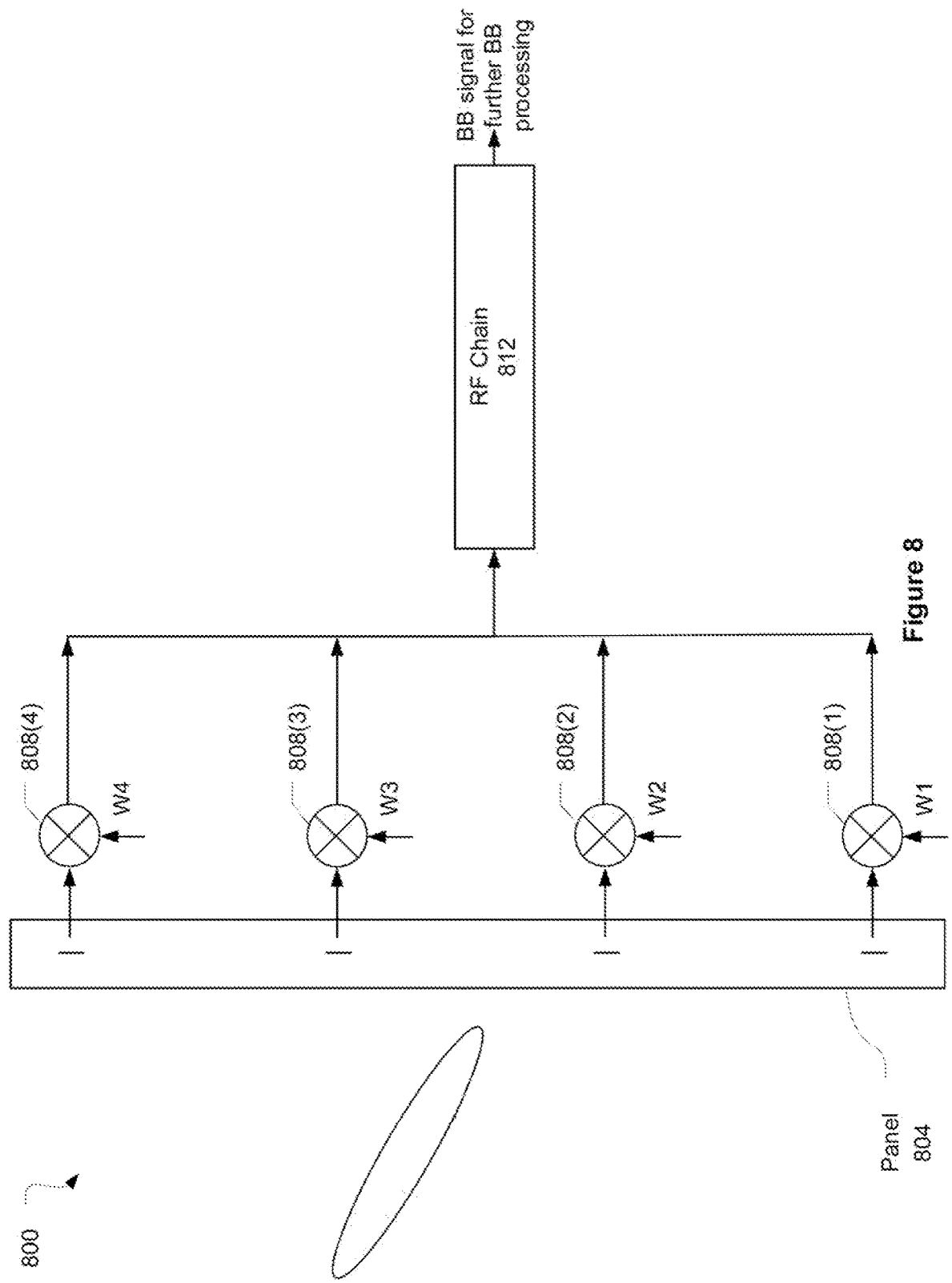
FIG. 8 illustrates an example of receive components, in accordance with some embodiments.

FIG. 8 illustrates receive components 800 of the UE 84 in accordance with some embodiments. The receive components 800 may include an antenna panel 804 that includes a number of antenna elements. The panel 804 is shown with four antenna elements, but other embodiments may include other numbers.

The antenna panel 804 may be coupled to analog beamforming (BF) components that include a number of phase shifters 808(1)-808(4). The phase shifters 808(1)-808(4) may be coupled with a radio-frequency (RF) chain 812. The RF chain 812 may amplify a receive analog RF signal, down convert the RF signal to baseband, and convert the analog baseband signal to a digital baseband signal that may be provided to a baseband processor for further processing.

In various embodiments, control circuitry, which may reside in a baseband processor, may provide BF weights (for example W1-W4), which may represent phase shift values to the phase shifters 808(1)-808(4) to provide a receive beam at the antenna panel 804. These BF weights may be determined based on the channel-based beamforming.

Figure 9:
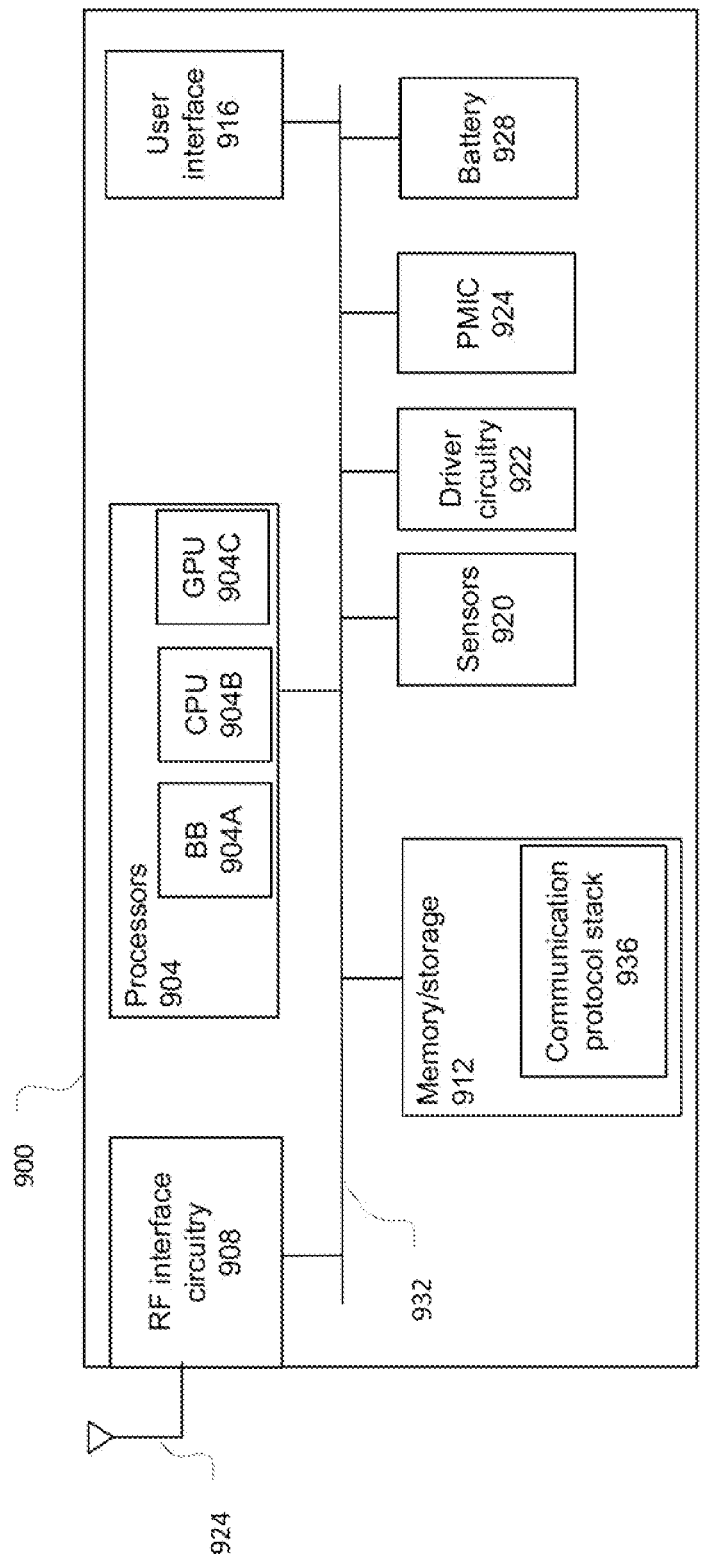
FIG. 9 illustrates an example of a UE, in accordance with some embodiments.

FIG. 9 illustrates a UE 900 in accordance with some embodiments. The UE 900 may be similar to and substantially interchangeable with UE 104 of FIG. 1.

Similar to that described above with respect to UE 104, the UE 900 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, and actuators), video surveillance/monitoring devices (for example, cameras, and video cameras), wearable devices, or relaxed-IoT devices. In some embodiments, the UE may be a reduced capacity UE or NR-Light UE.

The UE 900 may include processors 904, RF interface circuitry 908, memory/storage 912, user interface 916, sensors 920, driver circuitry 922, power management integrated circuit (PMIC) 924, and battery 928. The components of the UE 900 may be implemented as integrated circuits (ICs), portions thereof, discrete electronic devices, or other modules, logic, hardware, software, firmware, or a combination thereof. The block diagram of FIG. 9 is intended to show a high-level view of some of the components of the UE 900. However, some of the components shown may be omitted, additional components may be present, and different arrangements of the components shown may occur in other implementations.

The components of the UE 900 may be coupled with various other components over one or more interconnects 932 which may represent any type of interface, input/output, bus (local, system, or expansion), transmission line, trace, optical connection, etc. that allows various circuit components (on common or different chips or chipsets) to interact with one another.

The processors 904 may include processor circuitry such as, for example, baseband processor circuitry (BB) 904A, central processor unit circuitry (CPU) 904B, and graphics processor unit circuitry (GPU) 904C. The processors 904 may include any type of circuitry or processor circuitry that executes or otherwise operates computer-executable instructions, such as program code, software modules, or functional processes from memory/storage 912 to cause the UE 900 to perform operations as described herein.

In some embodiments, the baseband processor circuitry 904A may access a communication protocol stack 936 in the memory/storage 912 to communicate over a 3GPP compatible network. In general, the baseband processor circuitry 904A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 908.

The baseband processor circuitry 904A may generate or process baseband signals or waveforms that carry information in 3GPP-compatible networks. In some embodiments, the waveforms for NR may be based on cyclic prefix OFDM (CP-OFDM) in the uplink or downlink and discrete Fourier transform spread OFDM (DFT-S-OFDM) in the uplink.

The baseband processor circuitry 904A may also access group information 924 from memory/storage 912 to determine search space groups in which a number of repetitions of a PDCCH may be transmitted.

The memory/storage 912 may include any type of volatile or non-volatile memory that may be distributed throughout the UE 900. In some embodiments, some of the memory/storage 912 may be located on the processors 904 themselves (for example, L1 and L2 cache), while other memory/storage 912 is external to the processors 904 but accessible thereto via a memory interface. The memory/storage 912 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 908 may include transceiver circuitry and a radio frequency front module (RFEM) that allows the UE 900 to communicate with other devices over a radio access network. The RF interface circuitry 908 may include various elements arranged in transmit or receive paths. These elements may include switches, mixers, amplifiers, filters, synthesizer circuitry, control circuitry, etc.

In the receive path, the RFEM may receive a radiated signal from an air interface via an antenna 924 and proceed to filter and amplify (with a low-noise amplifier) the signal. The signal may be provided to a receiver of the transceiver that down-converts the RF signal into a baseband signal that is provided to the baseband processor of the processors 904.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 924.

In various embodiments, the RF interface circuitry 908 may be configured to transmit/receive signals in a manner compatible with NR access technologies.

The antenna 924 may include a number of antenna elements that each convert electrical signals into radio waves to travel through the air and to convert received radio waves into electrical signals. The antenna elements may be arranged into one or more antenna panels. The antenna 924 may have antenna panels that are omnidirectional, directional, or a combination thereof to enable beamforming and multiple input, multiple output communications. The antenna 924 may include micro-strip antennas, printed antennas that are fabricated on the surface of one or more printed circuit boards, patch antennas, phased array antennas, etc. The antenna 924 may have one or more panels designed for specific frequency bands including bands in FR1 or FR2.

The user interface circuitry 916 includes various input/output (I/O) devices designed to enable user interaction with the UE 900. The user interface 916 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 900.

The sensors 920 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers; gyroscopes; or magnetometers; microelectromechanical systems or nanoelectromechanical systems comprising 3-axis accelerometers; 3-axis gyroscopes; or magnetometers; level sensors; flow sensors; temperature sensors (for example, thermistors); pressure sensors; barometric pressure sensors; gravimeters; altimeters; image capture devices (for example; cameras or lens-less apertures); light detection and ranging sensors; proximity sensors (for example, infrared radiation detector and the like); depth sensors; ambient light sensors; ultrasonic transceivers; microphones or other like audio capture devices; etc.

The driver circuitry 922 may include software and hardware elements that operate to control particular devices that are embedded in the UE 900, attached to the UE 900, or otherwise communicatively coupled with the UE 900. The driver circuitry 922 may include individual drivers allowing other components to interact with or control various input/output (I/O) devices that may be present within or connected to the UE 900. For example, driver circuitry 922 may include a display driver to control and allow access to a display device, a touchscreen driver to control and allow access to a touchscreen interface, sensor drivers to obtain sensor readings of sensor circuitry 920 and control and allow access to sensor circuitry 920, drivers to obtain actuator positions of electro-mechanic components or control and allow access to the electro-mechanic components, a camera driver to control and allow access to an embedded image capture device, or audio drivers to control and allow access to one or more audio devices.

The PMIC 924 may manage power provided to various components of the UE 900. In particular, with respect to the processors 904, the PMIC 924 may control power-source selection, voltage scaling, battery charging, or DC-to-DC conversion.

In some embodiments, the PMIC 924 may control, or otherwise be part of, various power saving mechanisms of the UE 900. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 900 may power down for brief intervals of time and thus save power. If there is no data traffic activity for an extended period of time, then the UE 900 may transition off to an RRC_Idle state, where it disconnects from the network and does not perform operations such as channel quality feedback, handover, etc. The UE 900 goes into a very low power state and it performs paging where again it periodically wakes up to listen to the network and then powers down again. The UE 900 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay, and it is assumed the delay is acceptable.

A battery 928 may power the UE 900, although in some examples the UE 900 may be mounted deployed in a fixed location and may have a power supply coupled to an electrical grid. The battery 928 may be a lithium-ion battery, a metal-air battery, such as a zinc-air battery, an aluminum-air battery, a lithium-air battery, and the like. In some implementations, such as in vehicle-based applications, the battery 928 may be a typical lead-acid automotive battery.

Figure 10:
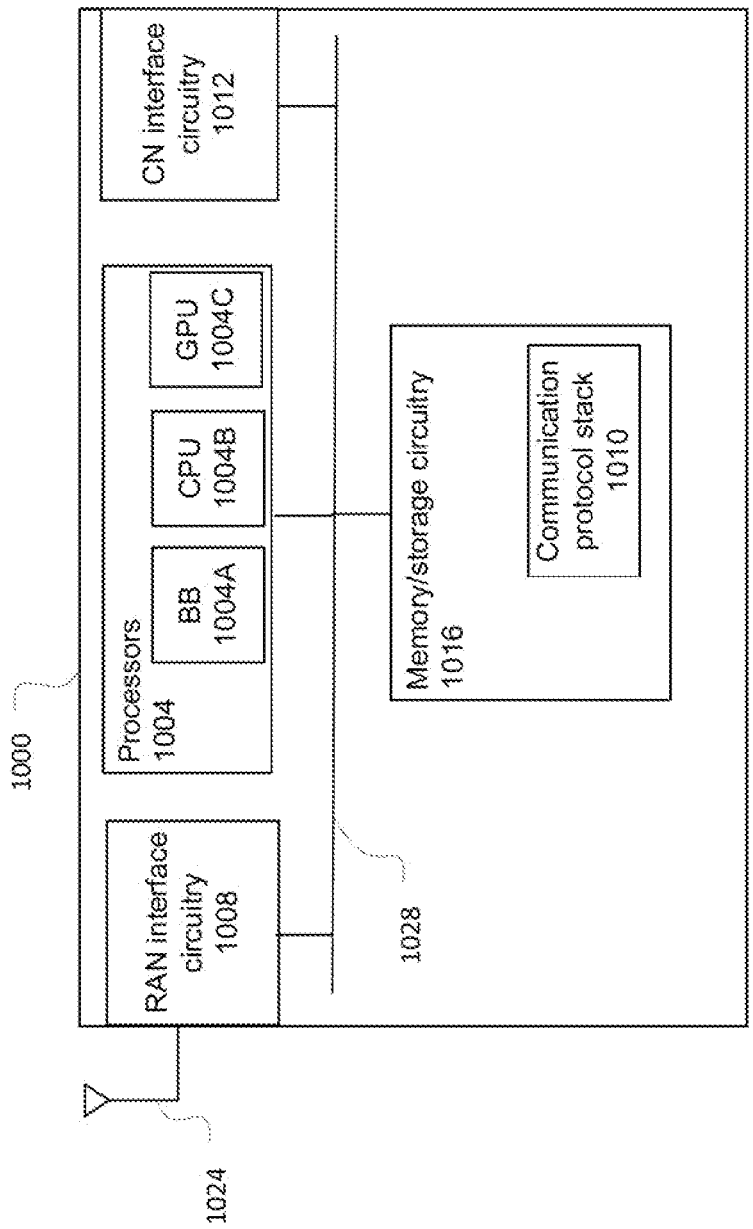
FIG. 10 illustrates an example of a base station, in accordance with some embodiments.

FIG. 10 illustrates a gNB 1000 in accordance with some embodiments. The gNB node 1000 may be similar to and substantially interchangeable with gNB 108. A base station, such as the base station 102, can have the same or similar components as the gNB 1000.

The gNB 1000 may include processors 1004, RF interface circuitry 1008, core network (CN) interface circuitry 1012, and memory/storage circuitry 1016.

The components of the gNB 1000 may be coupled with various other components over one or more interconnects 1028.

The processors 1004, RF interface circuitry 1008, memory/storage circuitry 1016 (including communication protocol stack 1010), antenna 1024, and interconnects 1028 may be similar to like-named elements shown and described with respect to FIG. 8.

The CN interface circuitry 1012 may provide connectivity to a core network, for example, a $5^{th}$ Generation Core network (5GC) using a 5GC-compatible network interface protocol, such as carrier Ethernet protocols or some other suitable protocol. Network connectivity may be provided to/from the gNB 1000 via a fiber optic or wireless backhaul. The CN interface circuitry 1012 may include one or more dedicated processors or FPGAs to communicate using one or more of the aforementioned protocols. In some implementations, the CN interface circuitry 1012 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry, as described above in connection with one or more of the preceding figures, may be configured to operate in accordance with one or more of the examples set forth below. For another example, circuitry associated with a UE, base station, network element, etc., as described above in connection with one or more of the preceding figures, may be configured to operate in accordance with one or more of the examples set forth below in the example section.

Examples

In the following sections, further exemplary embodiments are provided.

Example 1 includes a method. The method is implemented on an user equipment (UE). The method comprises: sending, to a network, capability information indicating whether the UE is capable of supporting a plurality of measurement gap configurations, wherein individual measurement gap configurations of the plurality of measurement gap configurations correspond to a respective frequency range of a plurality of frequency ranges; receiving, from the network based on the capability information, configuration information indicating a configuration of a measurement gap for a frequency range of the plurality of frequency ranges, wherein the frequency range includes frequencies equal to and larger than 52.6 GHz; determining, based on the configuration information, a measurement gap length and a measurement gap repetition period, wherein at least one of the measurement gap length or the measurement gap repetition period is based on the frequencies being equal to or larger than 52.6 GHz; and performing, based on the measurement gap length and the measurement gap repetition period, measurements on reference signals sent in the frequency range.

Example 2 includes a method. The method is implemented on a user equipment (UE). The method comprises: sending, to a network, capability information indicating whether the UE is capable of supporting a measurement gap configuration for a frequency range that includes frequencies equal to and larger than 52.6 GHz; receiving, from the network based on the capability information, configuration information indicating a configuration of a measurement gap for the frequency range; determining, based on the configuration information, a measurement gap length and a measurement gap repetition period, wherein at least one of the measurement gap length or the measurement gap repetition period is based on the frequencies being equal to or larger than 52.6 GHz and performing, based on the measurement gap length and the measurement gap repetition period, measurements on reference signals sent in the frequency range.

Example 3 includes a method of any preceding examples 1-2, wherein the plurality of frequency ranges includes a first frequency range (FR1) between 40 MHz and 7.125 GHz, a second frequency range (FR2) between 24.25 GHz and 52.6 GHz, and a third frequency range (FR3) between 52.6 GHz and 71 GHz, wherein the frequency range is the third frequency range (FR3).

Example 4 includes a method of any preceding examples 1-2, wherein the plurality of frequency ranges includes three frequency ranges, wherein the capability information indicates whether the UE is capable of supporting at least three measurement gap configurations that correspond to the three frequency ranges.

Example 5 includes a method of any preceding examples 1-2, wherein the plurality of frequency ranges includes three frequency ranges, wherein the capability information includes first capability information and second capability information, wherein the first capability information indicates whether the UE is capable of supporting two measurement gap configurations that correspond to two out of the three frequency ranges, and wherein the second capability information indicates whether the UE is capable of supporting three measurement gap configurations that correspond to the three frequency ranges.

Example 6 includes a method of example 5, wherein the second capability information is set to indicate that the UE is capable of supporting the three measurement gap configurations only if the first capability information is set to indicate that the UE is capable of supporting the two measurement gap configurations.

Example 7 includes a method of any preceding examples 1-2, wherein the plurality of frequency ranges includes a first frequency range, a second frequency range, and a third frequency range, wherein the capability information includes first capability information and second capability information, wherein the first capability information indicates whether the UE is capable of supporting a first measurement gap configuration for the first frequency range and a second measurement gap configuration for the second frequency range, and wherein the second capability information indicates whether the UE is capable of supporting a third measurement gap configuration for the third frequency range.

Example 8 includes a method of example 7, wherein the second capability information is set to indicate that the UE is capable of supporting the third measurement gap configuration only if the first capability information is set to indicate that the UE is capable of supporting the first measurement gap configuration and the second measurement gap configuration.

Example 9 includes a method of any preceding examples 1-4, wherein the capability information includes measurement gap capability information and band combination capability information, wherein the measurement gap capability information indicates whether the UE is capable of supporting at least two measurement gap configurations, wherein the band combination capability information indicates whether the UE is capable of supporting at least two band combinations, and wherein the measurement gap capability information and the band combination capability information jointly indicate supported measurement gap configurations.

Example 10 includes a method of any preceding examples 1-4, wherein the capability information includes a bitmap indicating the UE's support per frequency range of a corresponding measurement gap configuration.

Example 11 includes a method of any preceding examples 1-4, wherein the capability information includes an information element for the frequency range indicating the UE's support of a measurement gap configuration for the frequency range.

Example 12 includes a method of any preceding examples 1-11, wherein the frequency range is a first frequency range, wherein the UE is configured to transmit and receive in a plurality of frequency ranges that includes a second frequency range having frequencies smaller than 52.6 GHz, wherein the configuration information comprises a measurement gap index having a first value that is larger than twenty-five and that is associated with the first frequency range, and wherein the second frequency range is associated with values of the measurement gap index smaller than or equal to twenty-five.

Example 13 includes a method of any preceding examples 1-12, wherein the configuration information includes a measurement gap index, wherein the measurement gap length is determined from a first set of values based on the measurement gap index, and wherein the first set of values is defined as $$"2*\left(\frac{0.25}{2^k}\right) + \text{measurement gap duration}"$$

milliseconds, wherein "k" is equal to 0, 1, or 2.

Example 14 includes a method of example 13, wherein "measurement gap duration" is from a second set of values of {5, 3, 1, y} milliseconds, wherein "y" is smaller than one millisecond.

Example 15 includes a method of example 13, wherein the configuration information further includes a measurement gap timing advance that is equal to $$"\frac{0.25}{2^k}"$$

milliseconds.

Example 16 includes a method of any preceding examples 1-12, wherein the configuration information includes a measurement gap index, wherein the measurement gap repetition period is determined from a set of values based on the measurement gap index, and wherein the set of values is defined as $$"\left(\frac{20}{2^j}\right)"$$

milliseconds, wherein "j" is equal to 0, 1, or 2.

Example 17 includes a method of any preceding examples 1-16, wherein the configuration information includes the measurement gap length, the measurement gap repetition period, and a measurement gap timing advance, wherein the measurement gap length is equal to $$2*\left(\frac{0.25}{2^k}\right) + \text{measurement gap duration}"$$

milliseconds with "k" is equal to 0, 1, or 2 and the "measurement gap duration" is from a set of values of {5, 3, 1, y} with "y" smaller than one millisecond, wherein the measurement gap repetition period is equal to $$"\left(\frac{20}{2^j}\right)"$$

milliseconds with "j" is equal to 0, 1, or 2, and wherein the measurement gap timing advance is equal to $$"\frac{0.25}{2^k}"$$

milliseconds.

Example 18 includes a method of any preceding examples 1-17, wherein the capability information indicates capability of the UE to support a measurement gap configuration for the frequency range, wherein measurement objects are configured for the UE in the frequency range, and wherein the measurements are performed based on only the measurement objects.

Example 19 includes a method of any preceding examples 1-17, wherein the UE is configured to transmit and receive in a plurality of frequency ranges that includes the frequency range, wherein the measurement gap configuration is a per-frequency range measurement gap configuration, wherein the capability information indicates capability of the UE to support only a per-UE measurement gap configuration, wherein the per-frequency range measurement gap configuration is used instead of the per-UE measurement gap configuration to determine the measurement gap length and the measurement gap repetition period when the UE has no serving cells in the remaining frequency ranges of the plurality of frequency ranges and measurement objects configured are for only the frequency range.

Example 20 includes a method. The method is implemented on a network node. The method comprises: receiving, from a user equipment (UE), capability information indicating whether the UE is capable of supporting a measurement gap configuration for a frequency range that includes frequencies equal to and larger than 52.6 GHz; sending, to the UE, based on the capability information, configuration information indicating a configuration of a measurement gap for the frequency range, wherein at least one of the measurement gap length or the measurement gap repetition period is based on the frequencies being equal to or larger than 52.6 GHz; and sending, to the UE based on the measurement gap length and the measurement gap repetition period, reference signals in the frequency range for measurements by the UE.

Example 21 includes a method of any preceding examples 1-20, wherein the frequency range is a first frequency range, wherein communications with the UE use a plurality of frequency ranges that include a second frequency range having frequencies smaller than 52.6 GHz, wherein the configuration information comprises a measurement gap index having a first value that is larger than twenty-five and that is associated with the first frequency range, and wherein the second frequency range is associated with values of the measurement gap index smaller than or equal to twenty-five.

Example 22 includes a method of any preceding examples 1-20, wherein the configuration information includes the measurement gap length, the measurement gap repetition period, and a measurement gap timing advance, wherein the measurement gap length is equal to $$2*\left(\frac{0.25}{2^k}\right) + \text{measurement gap duration}"$$

milliseconds with "k" is equal to 0, 1, or 2 and the "measurement gap duration" is from a set of values of {5, 3, 1, y} with "y" smaller than one millisecond, wherein the measurement gap repetition period is equal to $$\text{``}\left(\frac{20}{2^j}\right)\text{''}$$

milliseconds with "j" is equal to 0, 1, or 2, and wherein the measurement gap timing advance is equal to $$\text{``}\frac{0.25}{2^k}\text{''}$$

milliseconds.

Example 23 includes a UE comprising means to perform one or more elements of a method described in or related to any of the examples 1-19.

Example 24 includes one or more computer-readable media comprising instructions to cause a UE, upon execution of the instructions by one or more processors of the UE, to perform one or more elements of a method described in or related to any of the examples 1-19.

Example 25 includes a UE comprising logic, modules, or circuitry to perform one or more elements of a method described in or related to any of the examples 1-19.

Example 26 includes a UE comprising: one or more processors and one or more computer-readable media comprising instructions that, when executed by the one or more processors, cause the one or more processors to perform one or more elements of a method described in or related to any of the examples 1-19.

Example 27 includes a system comprising means to perform one or more elements of a method described in or related to any of the examples 1-19.

Example 28 includes a network node comprising means to perform one or more elements of a method described in or related to any of the examples 20-22 and 3-19.

Example 29 includes one or more computer-readable media comprising instructions to cause a network node, upon execution of the instructions by one or more processors of the network node, to perform one or more elements of a method described in or related to any of the examples 20-22 and 3-19.

Example 30 includes a network node comprising logic, modules, or circuitry to perform one or more elements of a method described in or related to any of the examples 20-22 and 3-19.

Example 31 includes a network node comprising: one or more processors and one or more computer-readable media comprising instructions that, when executed by the one or more processors, cause the one or more processors to perform one or more elements of a method described in or related to any of the examples 20-22 and 3-19.

Example 32 includes a network node comprising means to perform one or more elements of a method described in or related to any of the examples 20-22 and 3-19.

Any of the above-described examples may be combined with any other example (or combination of examples), unless explicitly stated otherwise. The foregoing description of one or more implementations provides illustration and description but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations, and modifications will become apparent to those skilled in the art once the above disclosure is fully appreciated. It is intended that the following claims be interpreted to embrace all such variations and modifications.

What is claimed is:

1. A method comprising:
   causing transmission, to a network, of capability information indicating whether a user equipment (UE) is capable of supporting more than one per-frequency range measurement gap configurations in a frequency range, wherein the capability information includes first capability information and second capability information, wherein the first capability information indicates whether the UE is capable of supporting two measurement gap configurations that correspond to two out of three frequency ranges that include the frequency range, and wherein the second capability information indicates whether the UE is capable of supporting three measurement gap configurations that correspond to the three frequency ranges;
   processing configuration information received from the network based on the capability information, the configuration information indicating a configuration of a measurement gap for the frequency range;
   determining, based on the configuration information, a measurement gap length and a measurement gap repetition period, wherein at least one of the measurement gap length or the measurement gap repetition period is based on frequencies of the frequency range; and
   performing, based on the measurement gap length and the measurement gap repetition period, measurements on reference signals sent in the frequency range.

2. The method of claim 1, wherein the capability information indicates whether the UE is capable of supporting more than one per-frequency range measurement gap configurations in each one of a plurality of frequency ranges, wherein the plurality of frequency ranges includes a first frequency range of up to 7.125 GHz, a second frequency range between 24.25 GHz and 52.6 GHz, and a third frequency range between 52.6 GHz and 71 GHz.

3. The method of claim 1, wherein the capability information indicates whether the UE is capable of supporting the three measurement gap configurations dependently on supporting the two measurement gap configurations.

4. The method of claim 1, wherein the second capability information is set to indicate that the UE is capable of supporting the three measurement gap configurations only if the first capability information is set to indicate that the UE is capable of supporting the two measurement gap configurations.

5. The method of claim 1, wherein the first capability information indicates whether the UE is capable of supporting a first measurement gap configuration for a first frequency range and a second measurement gap configuration for a second frequency range, and wherein the second capability information indicates whether the UE is capable of supporting a third measurement gap configuration for a third frequency range.

6. The method of claim 5, wherein the second capability information is set to indicate that the UE is capable of supporting the third measurement gap configuration only if the first capability information is set to indicate that the UE is capable of supporting the first measurement gap configuration and the second measurement gap configuration.

7. The method of claim 1, wherein the capability information includes measurement gap capability information and band combination capability information, wherein the measurement gap capability information indicates whether the UE is capable of supporting at least two measurement gap configurations, wherein the band combination capability information indicates whether the UE is capable of supporting at least two band combinations, and wherein the measurement gap capability information and the band combination capability information jointly indicate supported measurement gap configurations.

8. The method of claim 1, wherein the capability information includes a bitmap indicating the UE's support per frequency range of a corresponding measurement gap configuration.

9. The method of claim 1, wherein the capability information includes an information element for the frequency range indicating the UE's support of a measurement gap configuration for the frequency range.

10. An apparatus comprising:
processing circuitry configured to:
cause transmission, to a network, of capability information indicating whether a user equipment (UE) is capable of supporting more than one per-frequency range measurement gap configurations for a frequency range that includes frequencies equal to and larger than 52.6 GHz, wherein the capability information includes first capability information and second capability information, wherein the first capability information indicates whether the UE is capable of supporting two measurement gap configurations that correspond to two out of three frequency ranges that include the frequency range, and wherein the second capability information indicates whether the UE is capable of supporting three measurement gap configurations that correspond to the three frequency ranges;
process configuration information that is received from the network based on the capability information that indicates a configuration of a measurement gap for the frequency range;
determine, based on the configuration information, a measurement gap length and a measurement gap repetition period, wherein at least one of the measurement gap length or the measurement gap repetition period is based on frequencies of the frequency range; and
perform, based on the measurement gap length and the measurement gap repetition period, measurements on reference signals sent in the frequency range.

11. The apparatus of claim 10, wherein the frequency range is a first frequency range, wherein the UE is configured to transmit and receive in a plurality of frequency ranges that includes a second frequency range having frequencies smaller than 52.6 GHz, wherein the configuration information comprises a measurement gap index having a first value that is larger than twenty-five and that is associated with the first frequency range, and wherein the second frequency range is associated with values of the measurement gap index smaller than or equal to twenty-five.

12. The apparatus of claim 10, wherein the configuration information includes a measurement gap index, wherein the measurement gap length is determined from a first set of values based on the measurement gap index, and wherein the first set of values is defined as $$"2*\left(\frac{0.25}{2^k}\right) + \text{measurement gap duration}"$$

milliseconds, wherein "k" is equal to 0, 1, or 2.

13. The apparatus of claim 12, wherein "measurement gap duration" is from a second set of values of {5, 3, 1, y} milliseconds, wherein "y" is smaller than one millisecond.

14. The apparatus of claim 12, wherein the configuration information further includes a measurement gap timing advance that is equal to $$"\frac{0.25}{2^k}"$$

milliseconds.

15. The apparatus of claim 10, wherein the configuration information includes a measurement gap index, wherein the measurement gap repetition period is determined from a set of values based on the measurement gap index, and wherein the set of values is defined as $$"\left(\frac{20}{2^j}\right)" \text{ milliseconds},$$

wherein "j" is equal to 0, 1, or 2.

16. The apparatus of claim 10, wherein the configuration information includes the measurement gap length, the measurement gap repetition period, and a measurement gap timing advance, wherein the measurement gap length is equal to $$"2*\left(\frac{0.25}{2^k}\right) + \text{measurement gap duration}"$$

milliseconds with "k" is equal to 0, 1 or 2 and the "measurement gap duration" is from a set of values of {5, 3, 1, y} with "y" smaller than one millisecond, wherein the measurement gap repetition period is equal to $$"\left(\frac{20}{2^j}\right)"$$

milliseconds with "j" is equal to 0, 1, or 2, and wherein the measurement gap timing advance is equal to $$"\frac{0.25}{2^k}"$$

milliseconds.

17. A method comprising:
receiving, from a user equipment (UE), capability information indicating whether the UE is capable of supporting more than one per-frequency range measurement gap configurations for a frequency range that includes frequencies, wherein the capability information includes first capability information and second capability information, wherein the first capability information indicates whether the UE is capable of supporting two measurement gap configurations that correspond to two out of three frequency ranges that include the frequency range, and wherein the second capability information indicates whether the UE is capable of supporting three measurement gap configurations that correspond to the three frequency ranges;

sending, to the UE, based on the capability information, configuration information indicating a configuration of a measurement gap for the frequency range, wherein at least one of a measurement gap length or a measurement gap repetition period is based on the frequencies; and sending, to the UE based on the measurement gap length and the measurement gap repetition period, reference signals in the frequency range for measurements by the UE.

18. The method of claim 17, wherein the frequency range is a first frequency range having first frequencies that are larger than 52.6 GHz, wherein communications with the UE use a plurality of frequency ranges that includes a second frequency range having second frequencies smaller than 52.6 GHz, wherein the configuration information comprises a measurement gap index having a first value that is larger than twenty-five and that is associated with the first frequency range, and wherein the second frequency range is associated with values of the measurement gap index smaller than or equal to twenty-five.

19. The method of claim 17, wherein the configuration information includes the measurement gap length, the measurement gap repetition period, and a measurement gap timing advance, wherein the measurement gap length is equal to $$"2 * \left(\frac{0.25}{2^k}\right) + \text{measurement gap duration}"$$

milliseconds with "k" is equal to 0, 1, or 2 and the "measurement gap duration" is from a set of values of {5, 3, 1, y} with "y" smaller than one millisecond, wherein the measurement gap repetition period is equal to $$"\left(\frac{20}{2^j}\right)"$$

milliseconds with "j" is equal to 0, 1, or 2, and wherein the measurement gap timing advance is equal to $$"\frac{0.25}{2^k}".$$

* * * * *